US012634903B2

(12) United States Patent
Qiao

(10) Patent No.: US 12,634,903 B2
(45) Date of Patent: May 19, 2026

(54) TIME DOMAIN RESOURCE ASSIGNMENT METHOD AND APPARATUS

(71) Applicant: Beijing Xiaomi Mobile Software Co., Ltd., Beijing (CN)

(72) Inventor: Xuemei Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 288 days.

(21) Appl. No.: 18/558,259

(22) PCT Filed: May 6, 2021

(86) PCT No.: PCT/CN2021/091958
§ 371 (c)(1),
(2) Date: Oct. 31, 2023

(87) PCT Pub. No.: WO2022/233002
PCT Pub. Date: Nov. 10, 2022

(65) Prior Publication Data
US 2024/0284417 A1      Aug. 22, 2024

(51) Int. Cl.
*H04W 72/0446* (2023.01)
*H04W 72/1268* (2023.01)
*H04W 72/231* (2023.01)

(52) U.S. Cl.
CPC ... *H04W 72/0446* (2013.01); *H04W 72/1268* (2013.01); *H04W 72/231* (2023.01)

(58) Field of Classification Search
CPC ........... H04W 72/1268; H04W 72/231; H04W 72/0446
See application file for complete search history.

(56) References Cited

U.S. PATENT DOCUMENTS

| | | | | |
|---|---|---|---|---|
| 2019/0313427 | A1* | 10/2019 | Chen | H04W 72/04 |
| 2020/0029315 | A1* | 1/2020 | Lin | H04W 52/0216 |
| 2020/0275431 | A1* | 8/2020 | Bae | H04W 72/04 |
| 2020/0314875 | A1* | 10/2020 | Fakoorian | H04W 72/23 |
| 2020/0374911 | A1* | 11/2020 | Lee | H04L 5/0007 |
| 2021/0022158 | A1* | 1/2021 | Wei | H04L 1/08 |
| 2021/0051652 | A1 | 2/2021 | Khoshnevisan et al. | |
| 2021/0076384 | A1* | 3/2021 | MolavianJazi ... | H04W 72/0453 |

(Continued)

FOREIGN PATENT DOCUMENTS

JP        2021-503734 A      2/2021

OTHER PUBLICATIONS

Ericsson, "TB Processing over Multi-Slot PUSCH", 3GPP TSG-RAN WG1 Meeting #104b-e (R1-2103445), e-Meeting, Apr. 12 to Apr. 20, 2021, 17 pages.

(Continued)

*Primary Examiner* — Jael M Ulysse
(74) *Attorney, Agent, or Firm* — Finnegan, Henderson, Farabow, Garrett & Dunner, L.L.P.

(57) ABSTRACT

A time domain resource assignment method is performed by a terminal device, and includes: obtaining a time domain resource assignment (TDRA) table in response to a current time slot being a special time slot, wherein the current time slot is configured for transmitting a transport block (TBoMS) over a plurality of time slots; and determining a target time domain resource for transmitting the TBoMS on the special time slot according to the TDRA table.

12 Claims, 9 Drawing Sheets

(56) References Cited

U.S. PATENT DOCUMENTS

| | | | | | |
|---|---|---|---|---|---|
| 2021/0120530 | A1* | 4/2021 | Xia | ................... | H04L 5/0048 |
| 2021/0136802 | A1* | 5/2021 | Cirik | ................... | H04B 7/0695 |
| 2021/0282136 | A1* | 9/2021 | Lopez | ................. | H04L 1/1854 |
| 2021/0392679 | A1* | 12/2021 | Kim | ................... | H04W 72/23 |
| 2022/0104219 | A1* | 3/2022 | Sridharan | ............ | H04L 1/1614 |
| 2022/0116967 | A1* | 4/2022 | Yeo | ................... | H04W 72/1268 |
| 2022/0159706 | A1* | 5/2022 | Panteleev | ............ | H04W 72/23 |
| 2022/0191903 | A1* | 6/2022 | Bae | ................... | H04L 1/08 |
| 2022/0303073 | A1* | 9/2022 | Yao | ................... | H04L 5/0051 |
| 2022/0303988 | A1* | 9/2022 | Yi | ................... | H04L 5/0044 |
| 2022/0322390 | A1* | 10/2022 | Nogami | ........... | H04W 72/0446 |
| 2022/0337278 | A1* | 10/2022 | Caporal Del Barrio | .................... | |
| | | | | | H04W 36/0072 |
| 2022/0353879 | A1* | 11/2022 | Choi | ................... | H04L 5/0007 |
| 2022/0377767 | A1* | 11/2022 | Ying | ................... | H04L 1/1887 |
| 2023/0062788 | A1* | 3/2023 | Wei | ................... | H04L 5/0032 |
| 2023/0239080 | A1* | 7/2023 | Marinier | ................ | H04L 1/189 |
| | | | | | 714/748 |
| 2023/0261796 | A1* | 8/2023 | Kim | ................... | H04L 5/0044 |
| | | | | | 370/329 |
| 2023/0291523 | A1* | 9/2023 | Hasegawa | ........... | H04W 52/281 |
| 2023/0292254 | A1* | 9/2023 | Kuchi | ................. | H04L 1/1819 |
| 2023/0361957 | A1* | 11/2023 | Abdelghaffar | ........ | H04W 72/23 |
| 2024/0022384 | A1* | 1/2024 | Liu | ................... | H04B 1/713 |
| 2024/0137146 | A1* | 4/2024 | Yoshimura | ............. | H04L 1/189 |
| 2024/0163011 | A1* | 5/2024 | Hasegawa | ............ | H04L 1/0071 |
| 2024/0163869 | A1* | 5/2024 | Nogami | ........... | H04W 72/0446 |
| 2024/0172267 | A1* | 5/2024 | Yoshimura | ........... | H04L 1/0057 |
| 2024/0179700 | A1* | 5/2024 | Su | ................... | H04L 1/189 |
| 2024/0188053 | A1* | 6/2024 | Yamamoto | ........... | H04W 72/21 |
| 2024/0188083 | A1* | 6/2024 | Kittichokechai | ..... | H04L 1/1861 |
| 2024/0298318 | A1* | 9/2024 | Andersson | ........ | H04W 72/1273 |
| 2025/0286673 | A1* | 9/2025 | Su | ................... | H04L 5/0094 |

OTHER PUBLICATIONS

Search Report for EP application 21939650.4, dated May 15, 2024, 10 pages.

International Search Report and Written Opinion of International Application No. PCT/CN2021/091958, dated Jan. 30, 2022, 11 pages.

Panasonic, "Discussion on TB processing over multi-slot PUSCH", 3GPP TSG RAN WG1 #104bis-e, R1-2103208, e-Meeting, Apr. 12-20, 2021, 6 pages.

Notice of the first review opinion issued by the Japanese Patent Office on Sep. 6, 2024, in corresponding Application No. JP 2023-567882, 5 pages.

Office Action issued by the Intellectual Property India on May 13, 2025, in corresponding Application No. IN 202347080721, 7 pages.

Discussion on TB processing over multi-slot PUSCH, China Telecom, 3GPP TSG RAN WG1 #104bis-e, R1-2102861, e-Meeting, Apr. 12-20, 2021, 5 pages.

"Discussion on PUSCH TB processing over multiple slots", vivo., 3GPP TSG RAN WG1 #104b-e, R2-2102535, e-Meeting, Apr. 12-20, 2021, 6 pages.

Nokia, Nokia Shanghai Bell, "Transport block processing for PUSCH coverage enhancements", 3GPP TSG RAN WG1 #104-e, R1-2101711, e-Meeting, Jan. 25-Feb. 5, 2021, 6 pages.

Request for the Submission of an Opinion for Korean Application No. 10-2023-7041473, dated Jan. 7, 2026, Dec. 23, 2025, 11 pages.

* cited by examiner

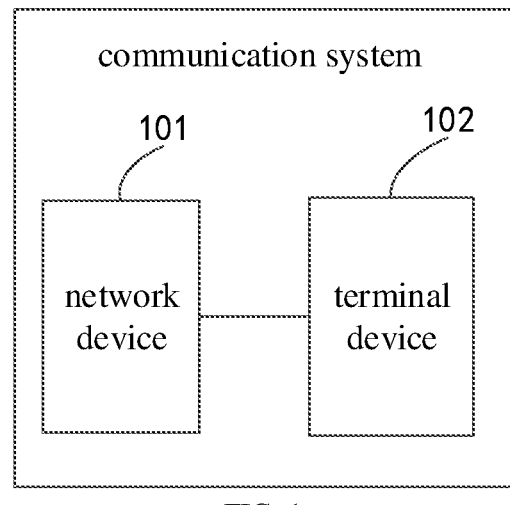

FIG. 1

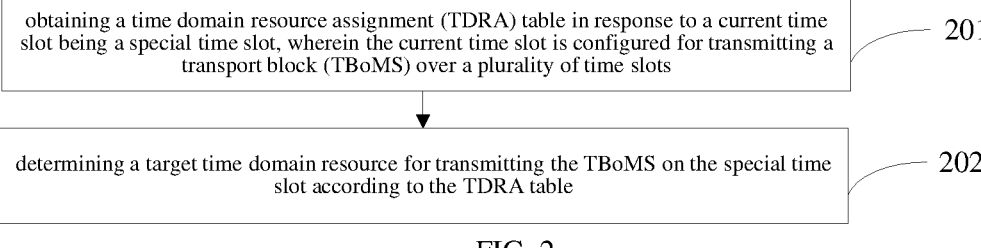

| | |
|---|---|
| obtaining a time domain resource assignment (TDRA) table in response to a current time slot being a special time slot, wherein the current time slot is configured for transmitting a transport block (TBoMS) over a plurality of time slots | 201 |
| determining a target time domain resource for transmitting the TBoMS on the special time slot according to the TDRA table | 202 |

FIG. 2

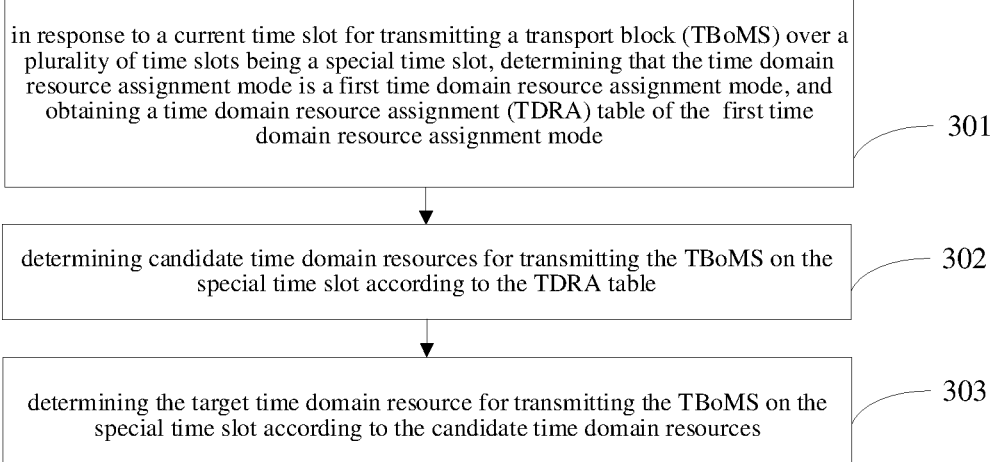

| | |
|---|---|
| in response to a current time slot for transmitting a transport block (TBoMS) over a plurality of time slots being a special time slot, determining that the time domain resource assignment mode is a first time domain resource assignment mode, and obtaining a time domain resource assignment (TDRA) table of the first time domain resource assignment mode | 301 |
| determining candidate time domain resources for transmitting the TBoMS on the special time slot according to the TDRA table | 302 |
| determining the target time domain resource for transmitting the TBoMS on the special time slot according to the candidate time domain resources | 303 |

FIG. 3

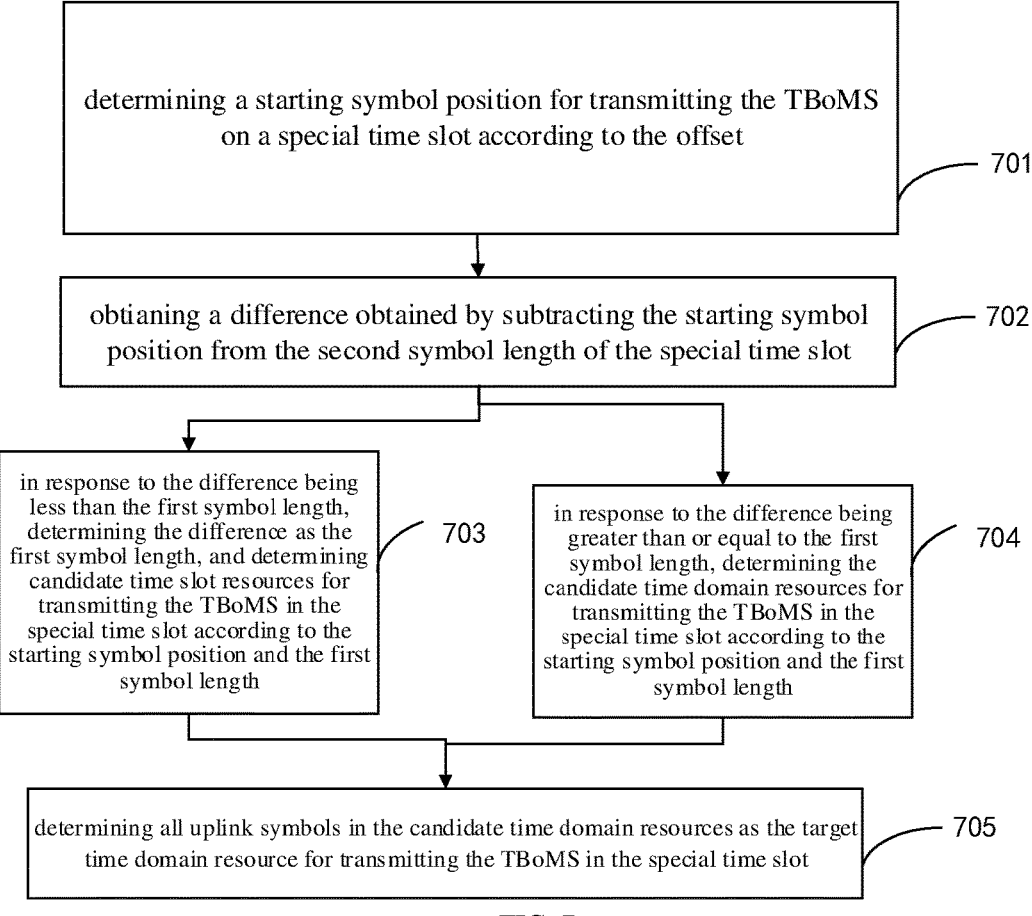

determining a starting symbol position for transmitting the TBoMS on a special time slot according to the offset — 701 obtianing a difference obtained by subtracting the starting symbol position from the second symbol length of the special time slot — 702 in response to the difference being less than the first symbol length, determining the difference as the first symbol length, and determining candidate time slot resources for transmitting the TBoMS in the special time slot according to the starting symbol position and the first symbol length — 703 in response to the difference being greater than or equal to the first symbol length, determining the candidate time domain resources for transmitting the TBoMS in the special time slot according to the starting symbol position and the first symbol length — 704 determining all uplink symbols in the candidate time domain resources as the target time domain resource for transmitting the TBoMS in the special time slot — 705

FIG. 7

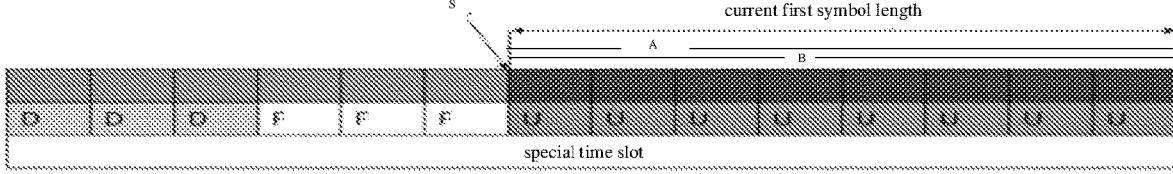

S current first symbol length

A

B special time slot

FIG. 8 determining a third symbol length of the uplink symbol on the special time slot according to a second symbol length of each continuous uplink symbol segment ⌐ 901 in response to the third symbol length being less than the first symbol length, determining the third symbol length as the first symbol length, and determining the uplink symbol with the first symbol length as the target time domain resource according to each continuous uplink symbol segment and the starting symbol position of each segment ⌐ 902 in response to the third symbol length being greater than or equal to the first symbol length, determining the uplink symbol of the first symbol length as the target time domain resource according to each continuous uplink symbol segment and the starting symbol position of each segment ⌐ 903

FIG. 9

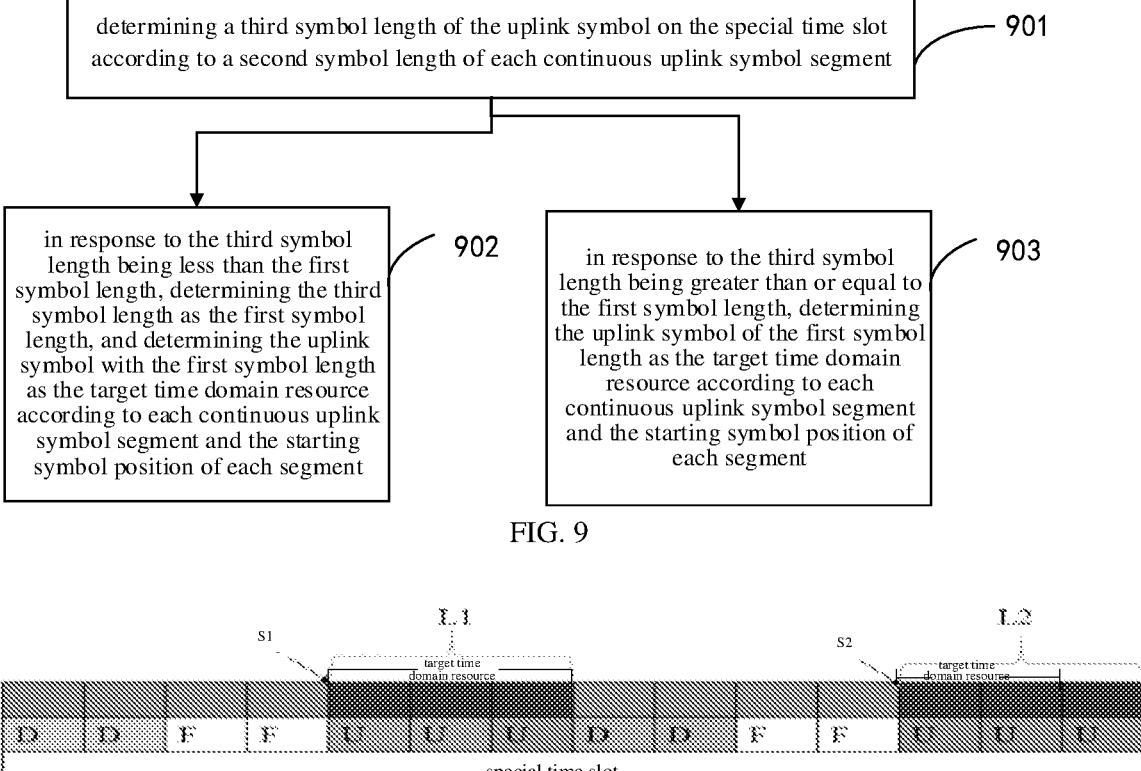

FIG. 10

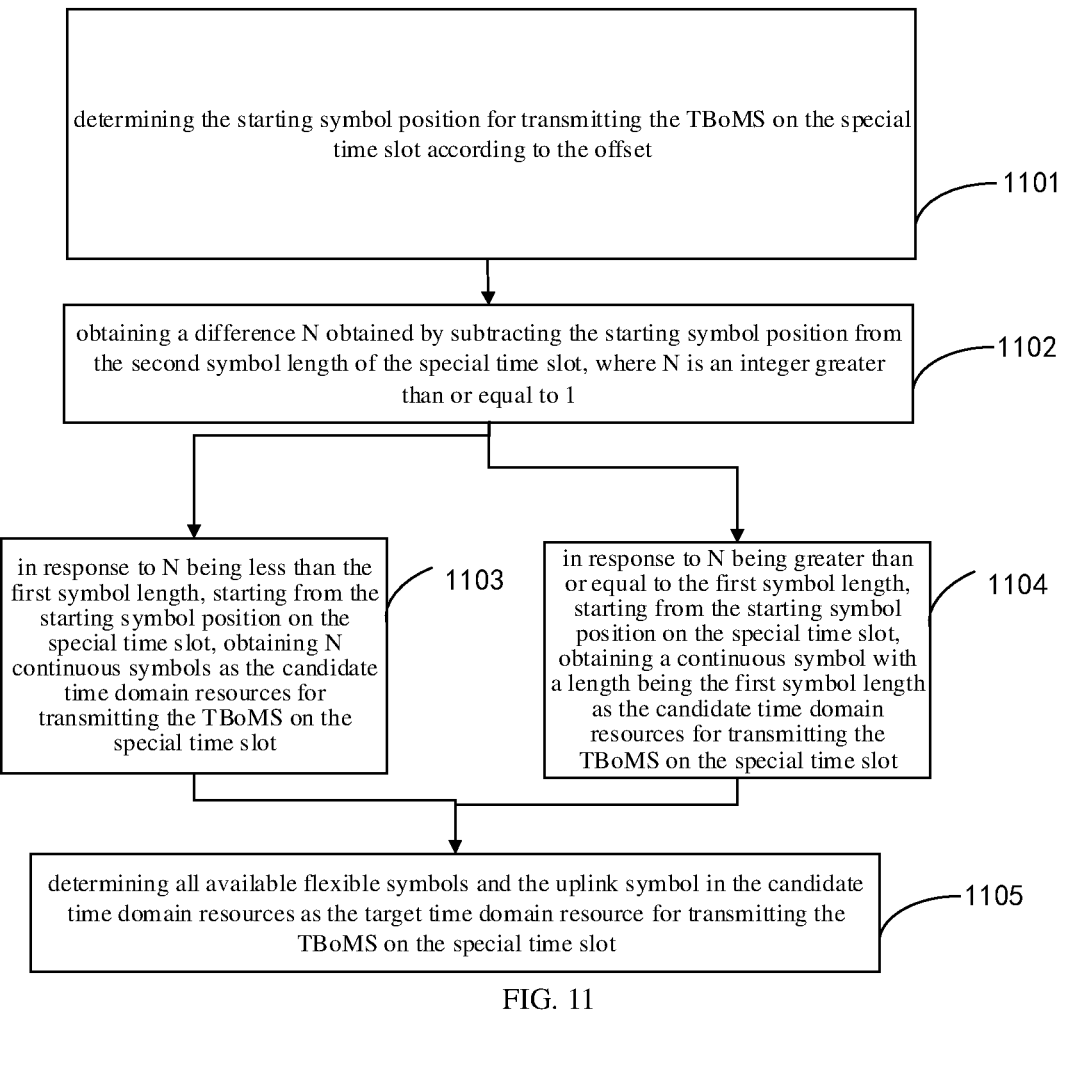

determining the starting symbol position for transmitting the TBoMS on the special time slot according to the offset — 1101 obtaining a difference N obtained by subtracting the starting symbol position from the second symbol length of the special time slot, where N is an integer greater than or equal to 1 — 1102 in response to N being less than the first symbol length, starting from the starting symbol position on the special time slot, obtaining N continuous symbols as the candidate time domain resources for transmitting the TBoMS on the special time slot — 1103 in response to N being greater than or equal to the first symbol length, starting from the starting symbol position on the special time slot, obtaining a continuous symbol with a length being the first symbol length as the candidate time domain resources for transmitting the TBoMS on the special time slot — 1104 determining all available flexible symbols and the uplink symbol in the candidate time domain resources as the target time domain resource for transmitting the TBoMS on the special time slot — 1105

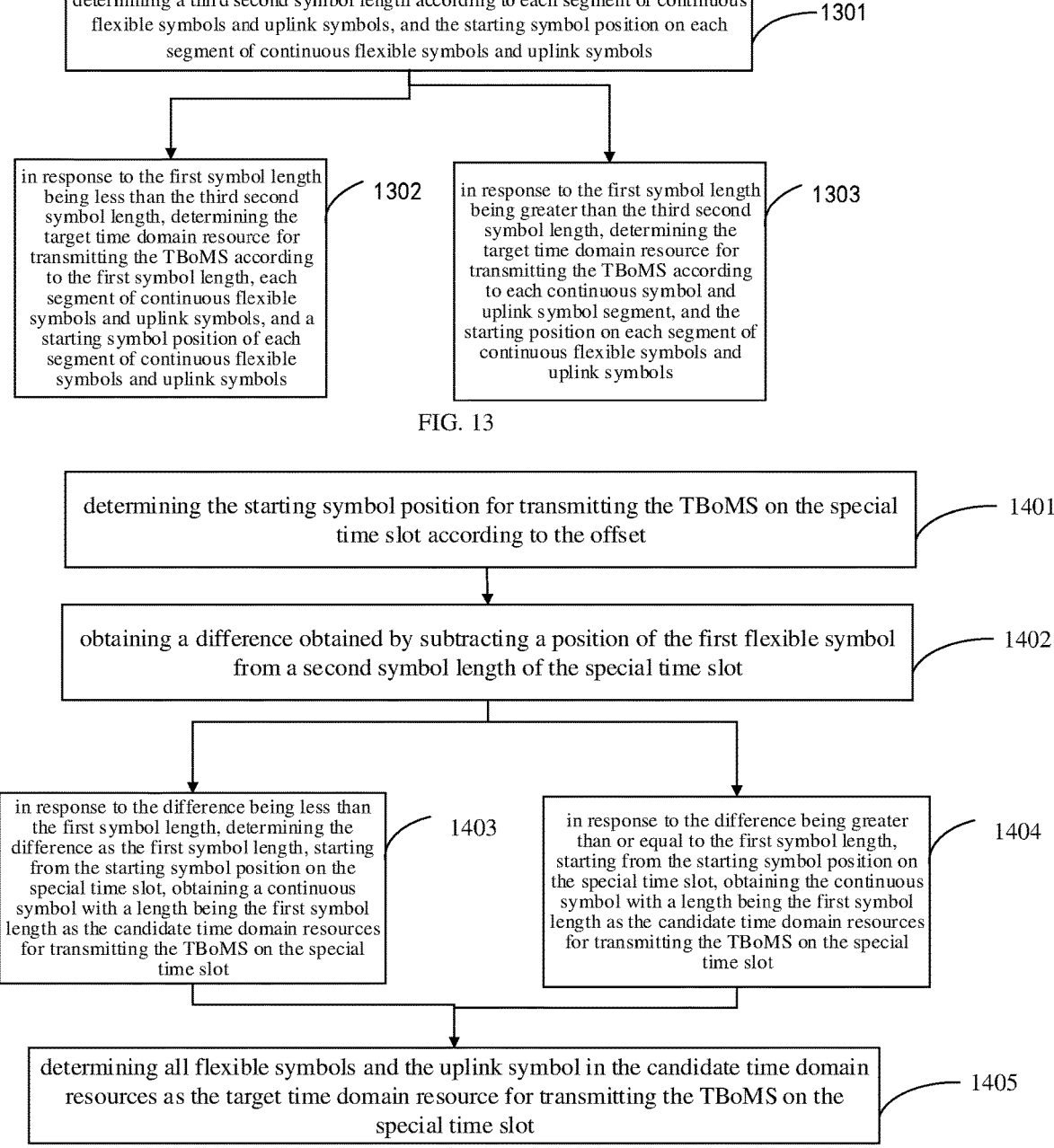

determining a third second symbol length according to each segment of continuous flexible symbols and uplink symbols, and the starting symbol position on each segment of continuous flexible symbols and uplink symbols ⟋ 1301 in response to the first symbol length being less than the third second symbol length, determining the target time domain resource for transmitting the TBoMS according to the first symbol length, each segment of continuous flexible symbols and uplink symbols, and a starting symbol position of each segment of continuous flexible symbols and uplink symbols ⟋ 1302 in response to the first symbol length being greater than the third second symbol length, determining the target time domain resource for transmitting the TBoMS according to each continuous symbol and uplink symbol segment, and the starting position on each segment of continuous flexible symbols and uplink symbols ⟋ 1303

FIG. 13 determining the starting symbol position for transmitting the TBoMS on the special time slot according to the offset ⟋ 1401 obtaining a difference obtained by subtracting a position of the first flexible symbol from a second symbol length of the special time slot ⟋ 1402 in response to the difference being less than the first symbol length, determining the difference as the first symbol length, starting from the starting symbol position on the special time slot, obtaining a continuous symbol with a length being the first symbol length as the candidate time domain resources for transmitting the TBoMS on the special time slot ⟋ 1403 in response to the difference being greater than or equal to the first symbol length, starting from the starting symbol position on the special time slot, obtaining the continuous symbol with a length being the first symbol length as the candidate time domain resources for transmitting the TBoMS on the special time slot ⟋ 1404 determining all flexible symbols and the uplink symbol in the candidate time domain resources as the target time domain resource for transmitting the TBoMS on the special time slot ⟋ 1405

FIG. 14 determining the starting symbol position for transmitting the TBoMS on the special time slot according to the offset — 1901 from the special time slot, obtaining M symbol segments located after the starting symbol position, and determining the M symbol segments as the target time domain resource for transmitting the TBoMS on the special time slot, wherein the symbol segment comprises an uplink symbol and an available flexible symbol, a total number of symbols in the M symbol segments is N, and M is an integer greater than or equal to 1 — 1902

FIG. 19

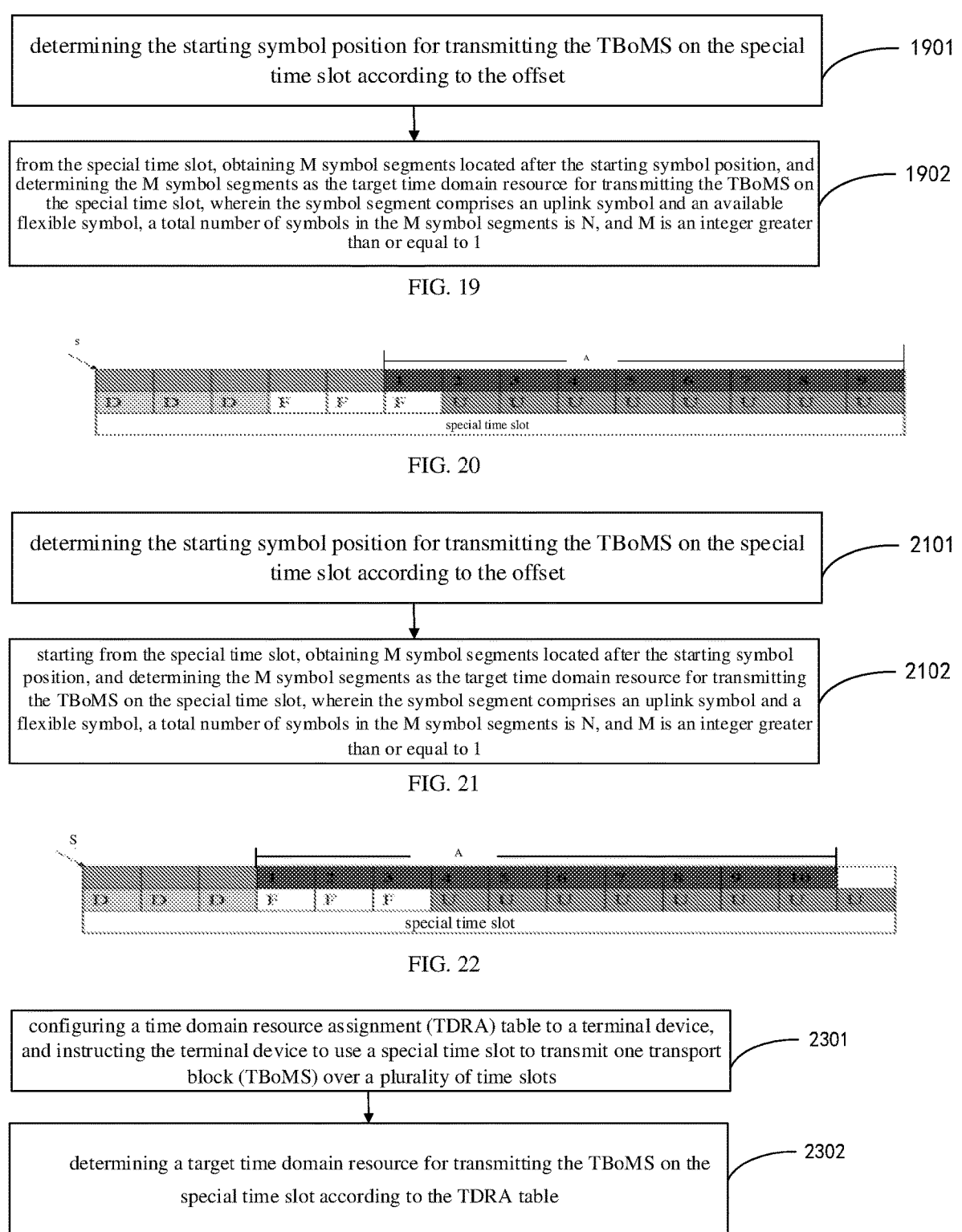

special time slot

FIG. 20 determining the starting symbol position for transmitting the TBoMS on the special time slot according to the offset — 2101 starting from the special time slot, obtaining M symbol segments located after the starting symbol position, and determining the M symbol segments as the target time domain resource for transmitting the TBoMS on the special time slot, wherein the symbol segment comprises an uplink symbol and a flexible symbol, a total number of symbols in the M symbol segments is N, and M is an integer greater than or equal to 1 — 2102

FIG. 21 special time slot

FIG. 22 configuring a time domain resource assignment (TDRA) table to a terminal device, and instructing the terminal device to use a special time slot to transmit one transport block (TBoMS) over a plurality of time slots — 2301 determining a target time domain resource for transmitting the TBoMS on the special time slot according to the TDRA table — 2302

FIG. 23

TIME DOMAIN RESOURCE ASSIGNMENT METHOD AND APPARATUS

CROSS-REFERENCE TO RELATED APPLICATIONS

The present application is a U.S. national phase application of International Application PCT/CN2021/091958, filed May 6, 2021, the entire disclosures of which are incorporated herein by reference.

TECHNICAL FIELD

The present disclosure relates to a communication technical field, and more particularly to a time domain resource assignment method and an apparatus.

BACKGROUND

At present, a time domain resource assignment of a physical uplink shared channel (PUSCH) may use a time domain resource assignment (TDRA) table similar to PUSCH replication type A. For a case that a PUSCH transmission mode is TB processing over multi-slots (TBoMS), if the TDRA table similar to PUSCH repetition type A is used for time-domain resource assignment, since the TDRA table of PUSCH repetition type A does not support the transmission of TBoMS on special time slots, the transmitting the TBoMS on special time slots cannot be performed, resulting in a waste of time-domain resources. Therefore, for transmitting the TBoMS, how to reasonably assign time domain resources on the special time slots is currently an urgent technical problem to be solved.

SUMMARY

Embodiments of the present disclosure provide a time domain resource assignment method and an apparatus, which is applied to communication scenarios between a terminal device and a network device in cellular mobile communication technology, so that the terminal device may accurately determine a target time domain resource for transmitting the TBoMS on the special time slot according to the TDRA table, which realize the transmission of the TBoMS on the special time slot, thereby improving the coding efficiency.

In a first aspect, embodiments of the present disclosure provide a time domain resource assignment method. The method is performed by a terminal device and includes: obtaining a time domain resource assignment (TDRA) table in response to a current time slot being a special time slot, in which the current time slot is configured for transmitting one transport block (TBoMS) over a plurality of time slots; and determining a target time domain resource for transmitting the TBoMS on the special time slot according to the TDRA table.

In a second aspect, embodiments of the present disclosure provide a time domain resource assignment method. The method is performed by a network device and includes: configuring a time domain resource assignment (TDRA) table to a terminal device, and instructing the terminal device to use a special time slot to transmit one transport block (TBoMS) over a plurality of time slots: determining a target time domain resource for transmitting the TBoMS on the special time slot according to the TDRA table.

In a third aspect, embodiments of the present disclosure provide a time domain resource assignment device. The device includes a processor; and a memory for storing computer programs executable by the processor. The processor is configured to perform the method in the first aspect.

In a fourth aspect, embodiments of the present disclosure provide a time domain resource assignment device. The device includes a processor; and a memory for storing computer programs executable by the processor. The processor is configured to perform the method in the second aspect.

BRIEF DESCRIPTION OF THE DRAWINGS

The drawings of the present disclosure will be briefly described below.

FIG. 1 is a schematic diagram of a communication system provided by an embodiment of the present disclosure;

FIG. 2 is a schematic flowchart of a time domain resource assignment method provided by an embodiment of the present disclosure;

FIG. 3 is a schematic flowchart of another time domain resource assignment method provided by an embodiment of the present disclosure:

FIG. 7 is a schematic flowchart of another time domain resource assignment method provided by an embodiment of the present disclosure;

FIG. 8 is an example 4 of candidate time domain resources and target time domain resources for transmitting the TBoMS on special time slots provided by embodiments of the present disclosure:

FIG. 9 is a schematic flowchart of another time domain resource assignment method provided by an embodiment of the present disclosure:

FIG. 10 is an example 5 of target time domain resources for transmitting the TBoMS on special time slots provided by an embodiment of the present disclosure;

FIG. 11 is a schematic flowchart of another time domain resource assignment method provided by an embodiment of the present disclosure:

FIG. 12 is an example 6 of candidate time domain resources for transmitting the TBoMS on special time slots provided by an embodiment of the present disclosure:

FIG. 13 is a schematic flowchart of another time domain resource assignment method provided by an embodiment of the present disclosure:

FIG. 14 is a schematic flowchart of another time domain resource assignment method provided by an embodiment of the present disclosure:

FIG. 19 is a schematic flowchart of another time domain resource assignment method provided by an embodiment of the present disclosure;

FIG. 20 is an example 9 of target time domain resources for transmitting the TBoMS on special time slots provided by an embodiment of the present disclosure:

FIG. 21 is a schematic flowchart of another time domain resource assignment method provided by an embodiment of the present disclosure;

FIG. 22 is an example 10 of target time domain resources for transmitting the TBoMS on special time slots provided by an embodiment of the present disclosure;

FIG. 23 is a schematic flowchart of a time domain resource assignment method provided by an embodiment of the present disclosure:

DETAILED DESCRIPTION

Figure 4:
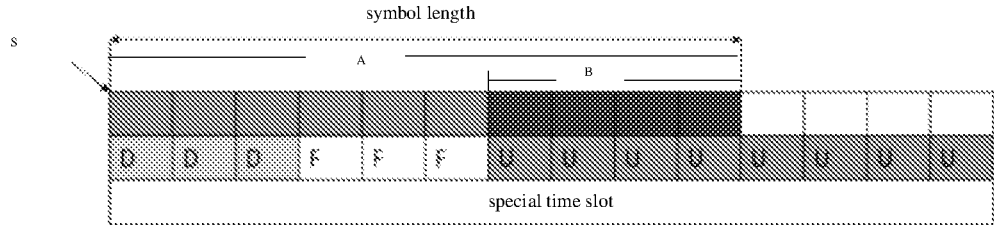
FIG. 4 is an example 1 of candidate time domain resources and target time domain resources for transmitting the TBoMS on special time slots provided by embodiments of the present disclosure.

In order to better understand the time domain resource assignment method disclosed in embodiments of the present disclosure, the communication system to which embodiments of the present disclosure is applicable is first described below.

Referring to FIG. 1, FIG. 1 is a schematic diagram of a communication system provided by an embodiment of the present disclosure. The communication system may include but is not limited to one network device and one terminal device. The number and form of devices shown in FIG. 1 are only for examples and do not constitute a limitation on embodiments of the present disclosure. In actual applications, two or more network devices, and two or more terminal devices may be included. The communication system shown in FIG. 1 includes a network device 101 and a terminal device 102 as an example.

It is noted that the technical solutions of embodiments of the present disclosure may be applied to various communication systems. For example: a long term evolution (LTE) system, a fifth generation (5G) mobile communication system, a 5G new radio (NR) system, or other future new mobile communication systems.

The network device 101 in embodiments of the present disclosure is an entity on the network side for transmitting or receive signals. For example, the network device 101 may be an evolved base station (evolved NodeB, eNB), a transmission reception point (TRP), a next generation base station (next generation NodeB, gNB) in an NR system, or other base stations in future mobile communication systems, or access nodes in wireless fidelity (WiFi) systems, etc. Embodiments of the present disclosure do not limit the specific technology and specific equipment form used by the network equipment. The network device provided by embodiments of the present disclosure may be composed of a centralized unit (CU) and a distributed unit (DU). The CU may also be called a control unit. The structure of CU-DU may separate the protocol layers of network device, such as base stations, and place some protocol layer functions under centralized control on the CU. The remaining part or all protocol layer functions are distributed in the DU, and the CU centrally controls the DU.

The terminal device 102 in embodiments of the present disclosure is an entity on the user side that is used to receive or transmit signals, such as a mobile phone. Terminal device may also be called a terminal, a user equipment (UE), a mobile station (MS), a mobile terminal (MT), etc. The terminal device may be a car with communication functions, a smart car, a mobile phone, a wearable device, a tablet (Pad), a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. Embodiments of the present disclosure do not limit the specific technology and specific equipment form used by the terminal device.

In the above communication system, a time domain resource assignment method similar to PUSCH repetition type A is usually used to assign time domain resources for transmitting the TBoMS. However, since it is determined that some of the symbols allocated on the special time slot are downlink symbols based on the TDRA table, uplink TBoMS cannot be transmitted on the special time slot. Therefore, TBoMS in the related art is configured for transmission, resulting in a waste of time domain resources and inability to encode efficiently. Therefore, for transmitting the TBoMS, how to reasonably allocate time domain resources on special time slots is an urgent technical issue that needs to be solved.

In embodiments of the present disclosure, the terminal device determines that the current time slot for transmitting the transport block (TBoMS) over the plurality of time slots is a special time slot, the time domain resource assignment (TDRA) table is obtained, and the target time domain resource for transmitting the TBoMS on the special time slot is determined according to the TDRA table. Thus, the target time domain resources for transmitting the TBoMS on the special time slot are accurately determined based on the TDRA table, which realizes the transmission of TBoMS on the special time slot, thereby improving the coding efficiency.

It is understood that the communication system described in embodiments of the present disclosure is to more clearly illustrate the technical solutions of embodiments of the present disclosure, and does not constitute a limitation on the technical solutions provided by embodiments of the present disclosure. As those skilled in the art will know, with the evolution of system architecture and the emergence of new business scenarios, the technical solutions provided in embodiments of the present disclosure are also applicable to similar technical problems.

A time domain resource assignment method and an apparatus provided by the present disclosure will be introduced in detail below with reference to the accompanying drawings.

Referring to FIG. 2, FIG. 2 is a schematic flowchart of a time domain resource assignment method provided by an embodiment of the present disclosure. The method is executed by a terminal device in the communication system shown in FIG. 1. As shown in FIG. 2, the method may include but is not limited to the following steps.

In step S201, a time domain resource assignment (TDRA) table is obtained in response to a current time slot being a special time slot, and the current time slot is configured for transmitting one transport block (TBoMS) over a plurality of time slots.

In step S202, a target time domain resource for transmitting the TBoMS on the special time slot is determined according to the TDRA table.

In embodiments of the present disclosure, the terminal device determines that the current time slot for transmitting a transport block (TBoMS) over the plurality of time slots is a special time slot, the time domain resource assignment (TDRA) table is obtained, and the target time domain resource for transmitting the TBoMS on the special time slot is determined based on the TDRA table. Thus, the target time domain resources for transmitting the TBoMS on the special time slot are accurately determined based on the TDRA table, which realizes the transmission of TBoMS on the special time slot, thereby improving the coding efficiency.

Based on the above embodiments, an implementation way of obtaining the time domain resource assignment TDRA table is: obtaining the time domain resource assignment mode; and obtaining the TDRA table corresponding to the time domain resource assignment mode.

In some illustrative implementations, the time domain resource assignment methods of embodiments of the present disclosure include three types. For the first time domain resource assignment mode, the first time domain resource assignment mode corresponds to a TDRA table of the existing PUSCH repetition type A. The TDRA table includes a first field and a second field. For example, the first field is an S field. The S field represents an offset of the starting symbol position for transmitting the TBoMS on the special time slot relative to a starting symbol position of the special time slot. A L field represents a symbol length between the starting symbol position and an ending symbol position for transmitting the TBoMS on the special time slot.

For the second time domain resource assignment method, in some embodiments, the TDRA table corresponding to the second time domain resource assignment includes a first field and a second field. The first field represents an offset between the starting symbol position for transmitting the TBoMS relative to a first uplink symbol position on the special time slot, and the second field represents the symbol length. In other embodiments, the TDRA table corresponding to the above second time domain resource assignment includes a first field and a second field. The first field represents an offset of a plurality of starting symbol positions for transmitting the TBoMS on the special time slot relative to a position of a first uplink symbol in continuous uplink symbol segments corresponding to the starting symbol positions respectively; and the second field represents a first symbol length. In other embodiments, the TDRA table corresponding to the above second time domain resource assignment includes a first field and a second field, the first field represents an offset of a starting symbol position for transmitting the TBoMS on the special time slot relative to a first available flexible symbol position on the special time slot, and the second field represents a first symbol length. In other embodiments, the TDRA table corresponding to the above second time domain resource assignment includes a first field and a second field. The first field represents an offset of a starting symbol position on each segment of continuous flexible symbols and uplink symbols on the special time slot relative to a position of a first available flexible symbol, and the second field represents a first symbol length. In other embodiments, the TDRA table corresponding to the above second time domain resource assignment includes a first field and a second field. The first field represents an offset of a starting symbol position for transmitting the TBoMS on the special time slot relative to a first flexible symbol position, and the second field represents a first symbol length. In other embodiments, the TDRA table corresponding to the above second time domain resource assignment includes a first field and a second field. The first field represents an offset of a starting symbol position on each continuous flexible symbol segment on the special time slot relative to a position of a first flexible symbol, and the second field represents a first symbol length.

In other embodiments, when the time domain resource assignment method is the third time domain resource assignment method, the TDRA table includes a first field and a second field, and the first field represents the starting symbol position configured for transmitting the TBoMS. Relative to the offset of the starting symbol position of the special time slot, the second field represents the number N of uplink symbols used for transmitting the TBoMS on the special time slot.

In some embodiments, when the time domain resource assignment method is a third time domain resource assignment mode, the TDRA table includes a first field and a second field. The first field represents an offset of a starting symbol position for transmitting the TBoMS relative to a starting symbol position of the special time slot, and the second field represents a number N of uplink symbols for transmitting the TBoMS on the special time slot. In some embodiments, when the time domain resource assignment method is a third time domain resource assignment method, the TDRA table includes a first field and a second field. The first field represents an offset of a starting symbol position for transmitting the TBoMS relative to a starting symbol position of the special time slot, and the second field represents a number N of uplink symbols and available flexible symbols for transmitting the TBoMS on the special time slot. In some embodiments, when the time domain resource assignment method is a third time domain resource assignment method, the TDRA table includes a first field and a second field. The first field represents an offset of the starting symbol position for transmitting the TBoMS on the special time slot relative to a starting symbol position of the special time slot, and the second field represents a number N of uplink symbols and flexible symbols for transmitting the TBoMS on the special time slot.

In some embodiments, the TDRA table corresponding to the above time domain resource assignment mode may be obtained by adjusting the existing TDRA table of PUSCH repetition type A based on the time domain resource assignment mode. In other embodiments, the TDRA table corresponding to the above time domain resource assignment mode may be the TDRA table of the existing PUSCH repetition type A.

In some embodiments, the above obtaining time domain resource assignment mode may be implemented in a variety of ways, examples are as follows.

In an illustrative implementation, a first configuration signaling is received; and a time domain resource assignment mode is determined according to the first configuration signaling.

In an embodiment of the present disclosure, the above-mentioned first configuration signaling is system message, a radio resource control (RRC) signaling, a downlink control information (DCI) signaling or a media access control control element (MAC CE) signaling. That is to say, the time domain resource assignment mode may be configured for the terminal device through any one of system messages, the radio resource control (RRC) signaling, the downlink control information (DCI) signaling, and the media access control control element (MAC CE) signaling.

As another illustrative implementation, the time domain resource assignment mode of the terminal device may be determined according to a communication protocol standard.

In another illustrative implementation, a time slot format index number of the special time slot may be obtained; and the time domain resource assignment mode corresponding to the time slot format index number may be obtained.

The above-mentioned time slot format index number may be determined by the terminal device based on the adopted communication protocol, or may be determined based on the time slot format indication sent by the network device. The way for determining the time slot format index number in embodiments of the present disclosure is not limited.

In other embodiments, the time slot format of the special time slot may be determined, and a corresponding time domain resource assignment mode may be determined based on the time slot format of the special time slot.

Specifically, in the case of using semi-static configuration, the terminal device may determine the time slot format of the special time slot based on the parameter information configured by the network device, and determine the corresponding time slot according to the time slot format of the special time slot. Domain resource assignment method.

Referring to FIG. 3, FIG. 3 is a schematic flowchart of another time domain resource assignment method provided by an embodiment of the present disclosure. This method is applied to the terminal device in the communication system shown in FIG. 1. It is noted that in embodiments of the present disclosure, when the time domain resource assignment mode is the first time domain resource assignment mode, the time domain resource assignment method of embodiments of the present disclosure will be further described.

As shown in FIG. 3, the method may include but is not limited to the following steps.

In step S301, in response to a current time slot for transmitting ne transport block (TBoMS) over a plurality of time slots being a special time slot, a time domain resource assignment mode of the terminal device is determined as a first time domain resource assignment mode, and a time domain resource assignment (TDRA) table of the first time domain resource mode is obtained.

In step S302, according to the TDRA table, candidate time domain resources for transmitting the TBoMS is determined on the special time slot.

In some embodiments, when the time domain resource assignment mode is the first time domain resource assignment mode, the TDRA table includes a first field and a second field. The first field represents an offset of a starting symbol position for transmitting the TBoMS on the special time slot relative to a starting symbol position of the special time slot, and the second field represents a symbol length between the starting symbol position and an ending symbol position for transmitting the TBoMS on the special time slot. Determining the candidate time domain resources for transmitting the TBoMS on the special time slot according to the TDRA table includes: determining the starting symbol position for transmitting the TBoMS on the special time slot according to the offset; determining the candidate time domain resources for transmitting the TBoMS on the special time slot according to the starting symbol position and the first symbol length.

In step S303, according to the candidate time domain resources, the target time domain resources for transmitting the TBoMS on the special time slot is determined.

In embodiments of the present disclosure, the terminal device determines that the current time slot for transmitting a transport block (TBoMS) over the plurality of time slots is a special time slot, the time domain resource assignment mode for terminal device is determined as the first time domain resource assignment mode, the time domain resource assignment (TDRA) table for the first time domain resource assignment mode is obtained, and the target time domain resources for transmitting the TBoMS on the special time slot is determined according to the TDRA table. Thus, the target time domain resources for transmitting the TBoMS on the special time slot are accurately determined based on the TDRA table, which realizes the transmission of TBoMS on the special time slot, thereby improving the coding efficiency.

Based on the above embodiments, in some embodiments, the candidate time domain resources include an uplink symbol, a downlink symbol and flexible symbols. In different application scenarios, according to the candidate time domain resources the target time domain resource for transmitting the TBoMS on the special time slot may be determined by many implementation ways.

In one embodiment, determining the implementation way for transmitting the TBoMS on the special time slot according to the candidate time domain resources may be: using uplink symbols in the candidate time domain resources as target time domain resources.

For example, the first field is an S field, and it is determined that an offset, represented by the S field, of the starting symbol position for transmitting the TBoMS on the special time slot relative to a starting symbol position of the special time slot is zero, that is, on the special time slot, the starting symbol position for transmitting the TBoMS overlaps with the starting symbol position of the special time slot. The second field represents a symbol length between the starting symbol position and the ending symbol position for transmitting the TBoMS on the special time slot, which is 10. The symbol resources of the special time slot are shown in FIG. 4. The mark S in FIG. 4 represents the starting symbol position for transmitting the TBoMS on the special time slot. Based on the symbol length, on the special time slot, starting from the starting symbol position S for transmitting the TBoMS, continuous symbols with a symbol length of 10 are obtained as candidate time domain resources. The candidate time domain resources for transmitting the TBoMS are marked as A in FIG. 4. The time domain resources corresponding to the mark A include the time domain resources between the starting symbol position on the special time slot and the tenth symbol position. Correspondingly, all uplink symbols in the candidate time domain resources may be used as target time domain resources. The target time domain resources for transmitting the TBoMS are shown as marked B in FIG. 4.

In other embodiments, determining the implementation way for transmitting the TBoMS on the special time slot according to the candidate time domain resources may be: determining the uplink symbols in the candidate time domain resources and the available flexible symbols in the flexible symbols as the target time domain resources.

Figure 5:
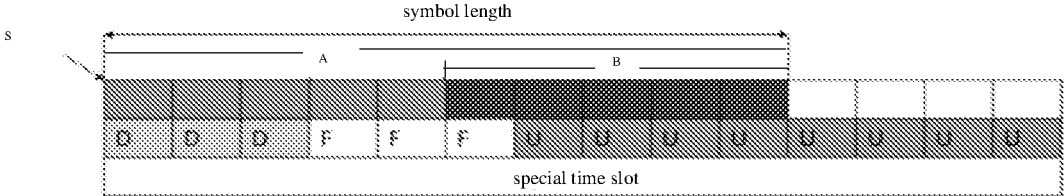
FIG. 5 is an example 2 of candidate time domain resources and target time domain resources for transmitting the TBoMS on special time slots provided by embodiments of the present disclosure.

For example, the first field is an S field, and it is determined that an offset, represented by the S field, of the starting symbol position for transmitting the TBoMS on the special time slot relative to the starting symbol position of the special time slot is zero, that is to say, on the special time slot, the starting symbol position for transmitting the TBoMS overlaps with the starting symbol position of the special time slot. The second field represents a symbol length between the starting symbol position and the ending symbol position for transmitting the TBoMS on the special time slot, which is 10. The symbol resources of the special time slot are shown in FIG. 5. Starting from the starting symbol position S for transmitting the TBoMS, continuous symbols with a length of 10 symbols may obtained as the candidate time domain resources, such as the time domain resource corresponding to the marked A in FIG. 5. The time domain resource corresponding to the mark A is the time domain resource between the starting symbol position and the tenth symbol position on the special time slot. Correspondingly, all uplink symbols in the candidate time domain resources and the available flexible symbols in the flexible symbols may be used as the target time domain resources. The target time domain resource is the time domain resource corresponding to a mark B in FIG. 5, that is, the target time domain resource for transmitting the TBoMS is the time domain resource corresponding to the mark B in FIG. 5.

In some embodiments, determining the implementation way for transmitting the TBoMS on the special time slot according to the candidate time domain resources may be: using uplink symbols and flexible symbols in the candidate time domain resources as the target time domain resources.

In some embodiments, in order to avoid conflicts between downlink transmission and the TBoMS transmission, in case that all uplink symbols and all flexible symbols in the candidate time domain resources are used for transmitting the TBoMS, the network device cancels the downlink data transmission on the downlink symbol before the flexible symbol.

Figure 6:
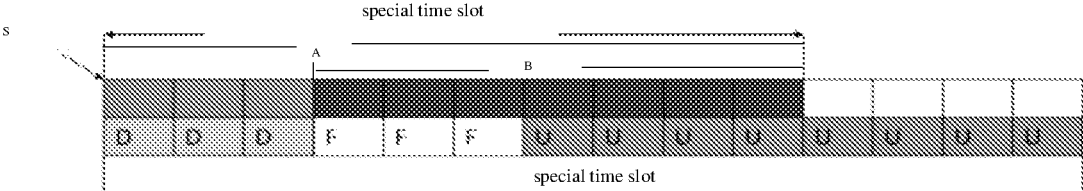
FIG. 6 is an example 3 of candidate time domain resources and target time domain resources for transmitting the TBoMS on special time slots provided by embodiments of the present disclosure.

For example, the first field is an S field, and it is determined that an offset, represented by the S field, of the starting symbol position for transmitting the TBoMS on the special time slot relative to the starting symbol position of the special time slot is zero, that is to say, on the special time slot, the starting symbol position for transmitting the TBoMS overlaps with the starting symbol position of the special time slot. The second field represents a symbol length between the starting symbol position and the ending symbol position for transmitting the TBoMS on the special time slot, which is 10. For example, the symbol resources of the special time slot is as shown in FIG. 6. From the starting symbol position S for transmitting the TBoMS, continuous symbols with a length of symbol length 10 may be obtained as the candidate time domain resources, such as the time domain resource corresponding to mark A as shown in FIG. 6. The time domain resource corresponding to the mark A is the time domain resource between the starting symbol position and the tenth symbol position on the special time slot. Correspondingly, all uplink symbols and all flexible symbols in the candidate time domain resources may be used as the target time domain resources. The target time domain resources are the time domain resources corresponding to a mark B in FIG. 6. That is, the target time domain resource for transmitting the TBoMS is the time domain resource corresponding to the mark B in FIG. 6.

In some embodiments, the candidate time domain resources include an uplink symbol, a downlink symbol and flexible symbols. According to the candidate time domain resources, an implementation way for determining the target time domain resources for transmitting the TBoMS on a special time slot is: in response to a priority of transmitting the TBoMS being a first priority, determining the uplink symbol in the candidate time domain resources as the target time domain resource.

In other embodiments, the candidate time domain resources include an uplink symbol, a downlink symbol and flexible symbols. According to the candidate time domain resources, an implementation way for determining the target time domain resources for transmitting the TBoMS on the special time slot is: in response to a priority of transmitting the TBoMS being a second priority, determining the uplink symbols in the candidate time domain resources and an available flexible symbol in the flexible symbols as the target time domain resource.

In other embodiments, the candidate time domain resources include an uplink symbol, a downlink symbol and flexible symbols. According to the candidate time domain resources, an implementation way for determining the target time domain resources for transmitting the TBoMS on the special time slot is: in response to a priority of transmitting the TBoMS being a second priority, determining the uplink symbol and the flexible symbols in the candidate time domain resources as the target time domain resource.

It is noted that a level of the second priority is higher than a level of the first priority.

That is to say, in embodiments of the present disclosure, in case that the priority of transmitting the TBoMS is the second priority, all flexible symbols and all uplink symbols in the candidate resources on the special time slot may be used for transmitting the TBoMS. Alternatively, part of flexible symbols and all uplink symbols in the candidate resources on special time slots may be used for transmitting the TBoMS. In case that the priority of transmitting the TBoMS is the first priority, all uplink symbols on the special time slot may be used for transmitting the TBoMS.

In some embodiments, the candidate time domain resources may include an uplink symbol, a downlink symbol and flexible symbols. According to the candidate time domain resources, an implementation way of determining the target time domain resources for transmitting the TBoMS on the special time slot is: in response to a transmission mode for transmitting the TBoMS being a license-free transmission mode and the flexible symbols on the special time slot being configured by a slot format indication, determining the uplink symbol in the candidate time domain resources as the target time domain resource.

In other embodiments, the above candidate time domain resources may include an uplink symbol, a downlink symbol and flexible symbols. Based on the candidate time domain resources, an implementation is to determine the target time domain resources for transmitting the TBoMS on a special time slot. The method is: in response to the transmission mode of TBoMS being a license-free transmission mode, and the flexible symbols on the special time slots are configured by high-level signaling, the uplink symbols in the candidate time domain resources and the available flexible symbols in the flexible symbols are as target time domain resources.

In other embodiments, the above-mentioned candidate time domain resources may include an uplink symbol, a downlink symbol and flexible symbols. According to the candidate time domain resources, an implementation way of determining the target time domain resources for transmitting the TBoMS on a special time slot is: in response to a transmission mode for transmitting the TBoMS being a license-free transmission mode, and the flexible symbols on the special time slot being configured by a high layer signaling, determining the uplink symbol in the candidate time domain resources and an available flexible symbol in the flexible symbols as the target time domain resource.

In some embodiments, the above-mentioned high layer signaling is a high layer signaling including a radio resource control (RRC) signaling and/or a medium access control (MAC) control element (CE) signaling The available flexible symbols in embodiments of the present disclosure are other flexible symbols in the flexible symbol segment except the flexible symbols used as protection symbols.

The protection symbols are flexible symbols required for downlink to uplink RX-TX conversion time information and timing advance (TA).

In some embodiments, in different scenarios, there are many ways to determine the above-mentioned available flexible symbols. The illustrative determination ways are as follows.

As an illustrative implementation, according to the number N of the protection symbols indicated in the second configuration signaling sent by the base station, the first N flexible symbols in each segment of continuous flexible symbols after the uplink symbol and the downlink symbols in the special time slot may be used as the protection symbols, and flexible symbols that are not used as the protection symbols in each segment of continuous flexible symbols as the available flexible symbols, where N is an integer greater than or equal to 1.

As another illustrative implementation, the first N flexible symbols in each segment of continuous flexible symbols on the special time slot may be determined as protection symbols the according to information in a protocol and/or a third configuration signaling of the base station, and a preset calculation rule, and the flexible symbols that are not used as the protection symbols in each segment of continuous flexible symbols are used as available flexible symbols, where N is an integer greater than or equal to 1. That is to say, in some embodiments, the first N flexible symbols in each segment of continuous flexible symbols on the special time slot may be determined as the protection symbols according to the protocol and the preset calculation rules, and the flexible symbols that are not used as the protection symbols in each segment of continuous flexible symbols are used as available flexible symbols. In other embodiments, the first N flexible symbols in each segment of continuous flexible symbols on the special time slot may be determined as the protection symbols according to the information in the third configuration signaling of the base station and the preset calculation rules, and the flexible symbols that are not used as the protection symbols in each segment of continuous flexible symbols are used as available flexible symbols. In some embodiments, the first N flexible symbols in each segment of continuous flexible symbols on the special time slot may be determined as the protection symbols according to the information in the protocol and the third configuration signaling of the base station and the preset calculation rules, and the flexible symbols that are not used as the protection symbols in each segment of continuous flexible symbols are used as available flexible symbols, where N is an integer greater than or equal to 1

The information in the third configuration signaling may include at least one of: downlink to uplink transition time information, timing advance information or subcarrier spacing information.

Referring to FIG. 7, FIG. 7 is a schematic flowchart of another time domain resource assignment method provided by an embodiment of the present disclosure. This method is applied to a terminal device in the communication system shown in FIG. 1. It is noted that in embodiments of the present disclosure, the time domain resource assignment mode of the terminal device is a second time domain resource assignment mode. In case of the second time domain resource assignment mode, the TDRA table includes a first field and a second field. The first field represents an offset between a starting symbol position for transmitting the TBoMS on the special time slot relative to the first uplink symbol position on the special time slot. The second field represents a first symbol length. As shown in FIG. 7, an implementation way of the above-mentioned step 202 is as follows.

In step S701, a starting symbol position for transmitting the TBoMS in the special time slot is determined according to the offset.

In step S702, a difference is obtained by subtracting the starting symbol position from the second symbol length of the special time slot.

In step S703, in response to the difference being less than the first symbol length, the difference is determined as the first symbol length, and candidate time domain resources for transmitting the TBoMS in the special time slot is determined according to the starting symbol position and the first symbol length.

In step S704, in response to the difference being greater than or equal to the first symbol length, the candidate time domain resources for transmitting the TBoMS in the special time slot is determined according to the starting symbol position and the first symbol length.

In step S705, all uplink symbols in the candidate time domain resources is determined as the target time domain resource for transmitting the TBoMS in the special time slot.

For example, in case that the above-mentioned offset is zero, at this time, the starting symbol position for transmitting the TBoMS in the special time slot may be determined to be the first uplink symbol position. Assume that the second field is L in the TDRA table or a L value in SLIV is 10, the second symbol length of the special time slot is 14, and the first uplink symbol position is 6, the second symbol length of the special time slot is subtracted by a first uplink symbol position to obtain a difference of 8. Comparing 10 with 8, it may be determined that the first symbol length represented by the second field is greater than the difference, and 8 may be used as the first symbol length. Based on the first uplink symbol position and the current first symbol length, the candidate time domain resources for transmitting the TBoMS are determined. A mark A in FIG. 8 represents candidate time domain resources. Correspondingly, all uplink symbol resources in the candidate time domain resources are determined as the target time domain resources for transmitting THE TBoMS, where a mark B in FIG. 8 represents the target time domain resource.

In embodiments of the present disclosure, according to the offset, the starting symbol position for transmitting the TBoMS in the special time slot is determined, and the difference obtained by subtracting the starting symbol position from the second symbol length of the special time slot is obtained. The difference is compared with the symbol length given in the second field of the TDRA table, and according to the comparison results, the candidate time domain resources for transmitting the TBoMS in the special time slot are determined, and the candidate time domain resources in the candidate time domain resources are determined. All uplink symbols serve as target time domain resources for transmitting the TBoMS in special time slots. Thus, the target time domain resources for transmitting the TBoMS on the special time slot are accurately determined and the time domain resources are rationally utilized.

Referring to FIG. 9, FIG. 9 is a schematic flowchart of another time domain resource assignment method provided by an embodiment of the present disclosure. The method is applied to the terminal device in the communication system shown in FIG. 1. It is noted that in embodiments of the present disclosure, the time domain resource assignment mode of the terminal device is a second time domain resource assignment mode. In case of the second time domain resource assignment mode, the first field represents an offset of a plurality of starting symbol positions for transmitting the TBoMS on the special time slot relative to a position of a first uplink symbol in continuous uplink symbol segments corresponding to the starting symbol positions respectively, and the second field represents a first symbol length. For example, as shown in FIG. 9, an implementation way of the above-mentioned step 202 is as follows.

In step S901, a third symbol length of the uplink symbol on the special time slot is determined according to a second symbol length of each continuous uplink symbol segment.

In step S902, in response to the third symbol length being less than the first symbol length, the third symbol length is determined as the first symbol length, and the uplink symbol with the first symbol length is determined as the target time domain resource according to each continuous uplink symbol segment and the starting symbol position of each segment.

In step S903, in response to the third symbol length being greater than or equal to the first symbol length, the uplink symbol of the first symbol length is determined as the target time domain resource according to each continuous uplink symbol segment and the starting symbol position of each segment.

In some embodiments, the above-mentioned special time slot may include a first continuous uplink symbol segment and a second continuous uplink symbol segment. The first continuous uplink symbol segment is before the second continuous uplink symbol segment. According to each segment of the continuous uplink symbols, based on the time domain resources on the above-mentioned special time slots, an illustrative implementation way for determining the target time domain resources for transmitting the TBoMS is: obtaining a symbol difference N by subtracting a symbol lengths of the first continuous uplink symbol segment from the first symbol length, selecting the first N uplink symbols from the second continuous uplink symbol segment, and determining the first continuous uplink symbol segment and the first N uplink symbols as the target time domain resources.

For example, the offset is zero, assuming that the symbol resource of the special time slot is as shown in FIG. 10, assuming that the second field is L in the TDRA table or the L value in SLIV is 5, since the offset is zero, the starting symbol position S1 of the first time domain resource for transmitting the TBoMS may be determined to be the position of the first uplink symbol in the first uplink symbol segment on the special time slot, and the starting symbol S2 of the second time domain resource for transmitting the TBoMS may be determined to be the position of the first uplink symbol in the second uplink symbol segment on the special time slot. For the special time slot shown in FIG. 10, the symbol length L1 of the first uplink symbol segment is 3, and the symbol length L2 of the second uplink symbol segment is 3. L1 is added to L2 to obtain the symbol length L3 of two uplink symbols segment, which is 6. Comparing the L3 and L values, it may be determined that L3 is greater than the L value. At this time, the three symbols of the first uplink symbol segment and the first two uplink symbol of the second uplink symbol segment may be determined as the target time domain resources for transmitting the TBoMS. That is, three symbols in the first uplink symbol segment and the first two uplink symbols in the second uplink symbol segment may be used for transmitting the TBoMS.

In embodiments of the present disclosure, a third symbol length of the uplink symbol on the special time slot is determined according to the second symbol length of each segment of the continuous uplink symbol, and in cast that the third symbol length is less than the first symbol length, the third symbol length is determined as the first symbol length. According to each segment of the continuous uplink symbols and each segment of the starting symbol position, the uplink symbol of the first symbol length is determined as the target time domain resource. In case that the third symbol length is greater than or equal to the first symbol length, the uplink symbol of the first symbol length may be determined as the target time domain resource according to each segment of the continuous uplink symbols and each segment of the starting symbol position. Thus, the target time domain resources for transmitting the TBoMS on the special time slot are accurately determined and the time domain resources are rationally utilized.

Referring to FIG. 11, FIG. 11 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a second time domain resource assignment mode. In case of the second time domain resource assignment mode, the TDRA table includes a first field and a second field. The first field represents an offset of a starting symbol position for transmitting the TBoMS on the special time slot relative to the first available flexible symbol position on the special time slot, and the second field represents a first symbol length, which is shown in FIG. 11, and an implementation way of the above-mentioned step 202 is as follows.

In step S1101, a starting symbol position for transmitting the TBoMS on the special time slot is determined according to the offset.

In step S1102, a difference N is obtained by subtracting the starting symbol position from the second symbol length of the special time slot, where N is an integer greater than or equal to 1.

In step S1103, in response to N being less than the first symbol length, starting from the starting symbol position on the special time slot, N continuous symbols are determined as the candidate time domain resources for transmitting the TBoMS on the special time slot; or In step S1104, in response to N being greater than or equal to the first symbol length, starting from the starting symbol position on the special time slot, a continuous symbol with a length being the first symbol length is determined as candidate time domain resources for transmitting the TBoMS on the special time slot.

In step S1105, all available flexible symbols and the uplink symbols in the candidate time domain resources is determined as the target time domain resources for transmitting the TBoMS on the special time slot.

For example, the above-mentioned offset is zero, assuming that the second symbol length of the special time slot is 14, the starting symbol position of the time domain resource for transmitting the TBoMS is 4. Assuming that the symbol length represented by the second field in the TDRA table is 10, a difference obtained by subtracting the starting symbol position from the second symbol length is 9. Comparing 9 with 10, it may be determined that the symbol length represented by the second symbol field is greater than the difference. Therefore, 9 may be determined as the symbol length for transmitting the TBoMS, and based on the determined symbol length, starting from the starting symbol position, continuous symbols with a symbol length of 9 is selected as the candidate time slot resources, the candidate time domain resources is as shown in a marked A in FIG. 12, all available flexible symbols and all uplink symbols in the candidate time slot resources are used as target time domain resources for transmitting the TBoMS. It may be understood that the target time domain resource and the candidate time domain resource in embodiments of the present disclosure are the same.

In embodiments of the present disclosure, according to the offset, the starting symbol position for transmitting the TBoMS on the special time slot is determined, and the difference N is obtained by subtracting the starting symbol position from the second symbol length of the special time slot. In case of N being less than the first symbol length, starting from the symbol starting position on the special time slot, N continuous symbols are obtained as the candidate time domain resources for transmitting the TBoMS on the special time slot. In case of N being greater than or equal to the first symbol length, from the symbol starting position on the special time slot, continuous symbols with a length of the first symbol length is obtained as the candidate time domain resources for transmitting the TBoMS on the special time slot, and all available flexible symbols and uplink symbols in the candidate time domain resources are determined as the target time domain resources for transmitting the TBoMS on special time slots. Thus, the target time domain resources for transmitting the TBoMS are accurately determined on the special time slots.

Referring to FIG. 13, FIG. 13 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a second time domain resource assignment mode. In case of the second time domain resource assignment mode, the TDRA table includes a first field and a second field. The first field represents an offset of each segment of continuous flexible symbol on the special time slot and a starting symbol position on the uplink symbol segment relative to a position of a first available flexible symbol, and the second field represents the first symbol length. As shown in FIG. 13, an implementation way of the above-mentioned step 202 is as follows.

In step S1301, a second symbol length is determined according to each segment of continuous flexible symbol and uplink symbol segment, and a starting symbol position on each continuous flexible symbol and the uplink symbol segment.

In step S1302, in response to the first symbol length being less than the second symbol length, according to the first symbol length, each continuous flexible symbol and the uplink symbol segment, and the starting symbol position on each continuous flexible symbol and the uplink symbol segment, the target time domain resource for transmitting the TBoMS is determined.

In step S1303, in response to the first symbol length being greater than the second symbol length, the target time domain resource for transmitting the TBoMS is determined according to each continuous symbol and uplink symbol segment, and the starting position on each continuous flexible symbol and the uplink symbol segment.

In embodiments of the present disclosure, the second symbol length is determined according to each continuous flexible symbol and uplink symbol segment, and the starting symbol position on each continuous flexible symbol and the uplink symbol segment; in response to the first symbol length being less than the second symbol length, the target time domain resource for transmitting the TBoMS is determined according to the first symbol length, each continuous flexible symbol and the uplink symbol segment, and the starting symbol position on each continuous flexible symbol and uplink symbol segment; in response to the first symbol length being greater than the second symbol length, the target time domain resource for transmitting the TBoMS is determined according to each continuous symbol and uplink symbol segment, and the starting position on each continuous flexible symbol and uplink symbol segment. Thus, the target time domain resources for transmitting the TBoMS are accurately determined on the special time slots.

Referring to FIG. 14, FIG. 14 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a second time domain resource assignment mode. In case of the second time domain resource assignment mode, the TDRA table includes a first field and a second field. The first field represents an offset of the starting symbol position for transmitting the TBoMS on the special time slot relative to the first flexible symbol position, and the second field represents a first symbol length. That is, the second field represents the continuous symbol length, which is taken as an example for description, as shown in FIG. 14, an implementation way of the above-mentioned step 202 is as follows.

In step S1401, the starting symbol position for transmitting the TBoMS on the special time slot is determined according to the offset.

In step S1402, a difference is obtained by subtracting a position of the first flexible symbol from the second symbol length of the special time slot.

In step S1403, in response to the difference value being less than the first symbol length, the difference value is determined as the first symbol length, from the symbol starting position on the special time slot, continuous symbols with a length of the first symbol length is obtained as candidate time domain resources for transmitting the TBoMS on the special time slot.

In step S1404, in response to the difference being greater than or equal to the first symbol length, from the symbol starting position on the special time slot, continuous symbols with a length of the first symbol length is obtained as candidates domain resources for transmitting the TBoMS on the special time slot.

In step S1405, all flexible symbols and uplink symbols in the candidate time domain resources are determined as the target time domain resources for transmitting the TBoMS on the special time slots.

Figure 15:
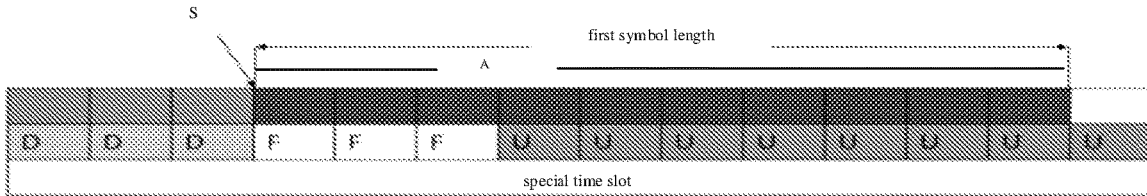
FIG. 15 is an example 7 of candidate time domain resources for transmitting the TBoMS on special time slots provided by an embodiment of the present disclosure.

For example, in case that the above-mentioned offset is zero, at this time, it may be determined that the position of the first flexible symbol in the special time slot is the starting symbol position of the time domain resources for transmitting the TBoMS on the special time slot, such as a mark S in FIG. 15. The starting symbol position is 4, assuming that the first symbol length is 10, and the symbol length of the special time slot is 14, the difference obtained by subtracting the starting symbol position from the symbol length of the special time slot is 10. Comparing the difference with the first symbol length, it may be seen that the two are the same. On the special time slot, starting from the mark S, a continuous symbol length with a symbol length of 10 may be obtained as a candidate time domain resource. The candidate time domain resource is as shown by mark A in FIG. 15, all flexible symbols and the uplink symbols in the candidate time slot resources may be used as the target time domain resources. In this example, the candidate time domain resource and the target time domain resource are the same.

In some embodiments, in order to avoid conflicts between the downlink transmission and the TBoMS transmission, the network device may prohibit downlink data transmission on the uplink symbol before the flexible symbol.

In embodiments of the present disclosure, the starting symbol position for transmitting the TBoMS on the special time slot is determined according to the offset, the difference is obtained by subtracting the position of the first flexible symbol from the second symbol length of the special time slot. In case that the difference is less than the length of the first symbol, the difference is determined as the first symbol length, from the starting symbol position on the special time slot, continuous symbols with a length of the first symbol are obtained as the candidate time domain resources for transmitting the TBoMS on the special time slot. In case that the difference is greater than or equal to the first symbol length, from the symbol starting position on the special time slot, continuous symbols with a length of the first symbol length are obtained as candidate time domain resources for transmitting the TBoMS on the special time slo. All flexible symbols and uplink symbols in the candidate time domain resources are used as the target time domain resources for transmitting the TBoMS on the special time slot. Thus, the target time domain resources for transmitting the TBoMS on the special time slot are accurately determined, and the time domain resources are rationally utilized.

Figure 16:
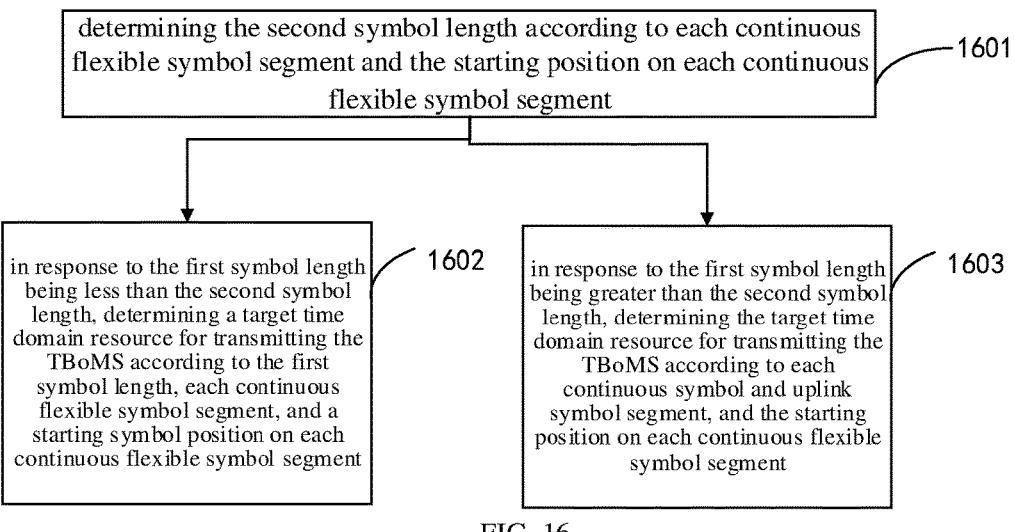
FIG. 16 is a schematic flowchart of another time domain resource assignment method provided by an embodiment of the present disclosure.

Referring to FIG. 16, FIG. 16 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a second time domain resource assignment mode. In case of the second time domain resource assignment mode, the TDRA table includes a first field and a second field. The first field represents an offset of the starting symbol position on each continuous flexible symbol segment in the special time slot relative to the position of the first flexible symbol, and the second field represents the length of the first symbol. As shown in FIG. 16, an implementation way of the above-mentioned step 202 is as follows.

In step S1601, the second symbol length is determined according to each continuous flexible symbol segment and the starting position on each continuous flexible symbol segment.

In step S1602, in response to the first symbol length being less than the second symbol length, the target time domain resource for transmitting the TBoMS is determined according to the first symbol length, each continuous flexible symbol segment, and the starting symbol position on each continuous flexible symbol segment.

In step S1603, in response to the first symbol length being greater than the second symbol length, the target time domain resource for transmitting the TBoMS is determined according to each continuous symbol and uplink symbol segment, and the starting position on each continuous flexible symbol segment.

In embodiments of the present disclosure, the second symbol length is determined according to each continuous flexible symbol segment and the starting position on each continuous flexible symbol segment. In case that the first symbol length is less than the second symbol length, the target time domain resource for transmitting the TBoMS is determined according to the first symbol length, each continuous flexible symbol segment, the starting symbol position on each continuous flexible symbol segment. In case that the first symbol length is greater than the second symbol length, the target time domain resources for transmitting the TBoMS is determined according to each continuous symbol and uplink symbol segments, and the starting position on each continuous flexible symbol segment. Thus, the target time domain resources for transmitting the TBoMS on the special time slot are accurately determined and the time domain resources are rationally utilized.

Figure 17:
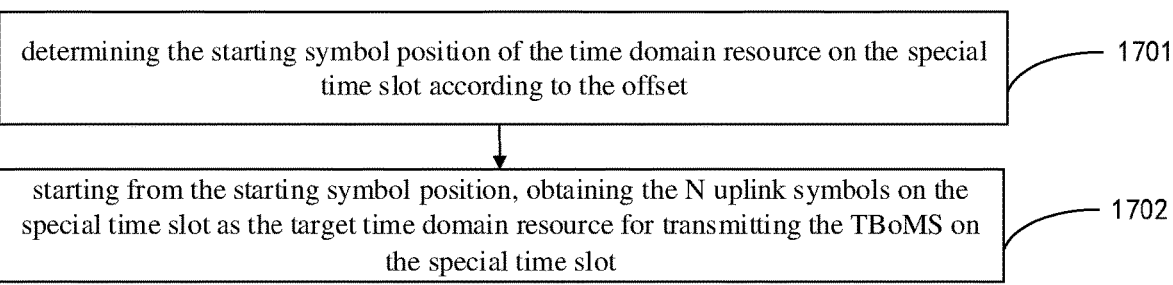
FIG. 17 is a schematic flowchart of another time domain resource assignment method provided by an embodiment of the present disclosure.

Referring to FIG. 17, FIG. 17 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a third time domain resource assignment mode. In case of the third time domain resource assignment mode, the TDRA table includes a first field and a second field. The first field represents an offset of the starting symbol position for transmitting the TBoMS relative to a starting symbol position of the special time slot, and the second field represents a number N of uplink symbols for transmitting the TBoMS on the special time slot, which is used as an example for description. As shown in FIG. 17, an implementation way of the above-mentioned step 202 is as follows.

In step S1701, the starting symbol position of the time domain resource on the special time slot is determined according to the offset.

In step S1702, starting from the starting symbol position, N uplink symbols on the special time slot are obtained as the target time domain resources for transmitting the TBoMS on the special time slot.

Figure 18:
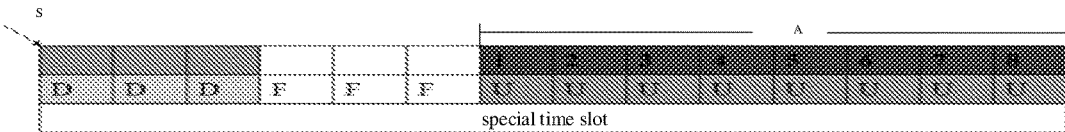
FIG. 18 is an example 8 of candidate time domain resources for transmitting the TBoMS on special time slots provided by an embodiment of the present disclosure.

For example, assuming that the offset is determined to be zero according to the first field, it may be determined that the starting symbol position for transmitting the TBoMS overlaps with the starting symbol position of the special time slot. The starting symbol position S for transmitting the TBoMS is as shown in FIG. 18. According to the second field, it is determined that the number N of uplink symbols for transmitting the TBoMS in the special time slot is 8. From the starting symbol position for transmitting the TBoMS, 8 uplink symbols may be obtained as the target time domain resources. The target time domain resource is indicated by a mark A shown in FIG. 18.

In embodiments of the present disclosure, according to the offset, the starting symbol position of the time domain resource on the special time slot is determined, and starting from the starting symbol position, N uplink symbols on the special time slot are obtained as the target time domain resource for transmitting the TBoMS on the special time slot. Thus, the target time domain resources for transmitting the TBoMS on the special time slot are accurately determined and the time domain resources are rationally utilized.

Referring to FIG. 19, FIG. 19 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is a third time domain resource assignment mode. In case of the third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and available flexible symbols for transmitting the TBoMS on the special time slot, which are used as an example. As shown in FIG. 19, an implementation way of the above-mentioned step 202 is as follows.

In step S1901, the starting symbol position for transmitting the TBoMS on the special time slot is determined according to the offset.

In step S1902, M symbol segments located after the starting symbol position are obtained from the special time slot, and the M symbol segments are determined as the target time domain resources for transmitting the TBoMS on the special time slot. The symbol segment comprises an uplink symbol and an available flexible symbol, a total number of symbols in the M symbol segments is N, and M is an integer greater than or equal to 1.

For example, the offset is determined to be zero according to the first field. At this time, it may be determined that the starting symbol position of the time domain resource for transmitting the TBoMS overlaps with the starting symbol position of the special time domain. The symbol resources corresponding to this special time slot are shown in FIG. 20, which may be used for the starting symbol position of the time domain resources for transmitting the TBoMS shown as a mark S in FIG. 20. Assuming that a number of symbol segment obtained after the starting symbol position is 1, and the symbol segment is marked as A in FIG. 20, at this time, the time domain resource corresponding to the mark A may be the target time domain resource. The symbol segment includes the available symbol field and all uplink symbols.

It is noted that, the way of determining the available symbol fields in embodiments of the present disclosure may refer to the relevant descriptions of the above-mentioned embodiments and will not be described again here.

In embodiments of the present disclosure, the starting symbol position for transmitting the TBoMS on the special time slot is determined according to the offset, M symbol segments located after the starting symbol position are obtained from the special time slot, and M symbol segments are determined as the target time domain resources for transmitting the TBoMS on special time slots. Thus, the target time domain resources for transmitting the TBoMS on the special time slot are accurately determined and the time domain resources are rationally utilized.

Referring to FIG. 21, FIG. 21 is a schematic flowchart of another time domain resource assignment method provided by an embodiment of the present disclosure. This method is applied to the terminal device in the communication system shown in FIG. 1. It is noted that in embodiments of the present disclosure, the time domain resource assignment mode of the terminal device is the third time domain resource assignment mode. In case of the third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and flexible symbols for transmitting the TBoMS on the special time slot, which are taken as an example for description. As shown in FIG. 21, an implementation way of the above-mentioned step 202 is as follows.

In step S2101, the starting symbol position for transmitting the TBoMS on the special time slot is determined according to the offset.

In step S2102, starting from the special time slot, M symbol segments located after the starting symbol position are obtained, and the M symbol segments are determined as the target time domain resource for transmitting the TBoMS on the special time slot. The symbol segment comprises an uplink symbol and a flexible symbol, a total number of symbols in the M symbol segments is N, and M is an integer greater than or equal to 1.

For example, the offset is determined to be zero according to the first field. At this time, it may be determined that the starting symbol position of the time domain resource for transmitting the TBoMS overlaps with the starting symbol position of the special time domain. The symbol resources corresponding to this special time slot are shown in FIG. 22, the starting symbol position of the time domain resources for transmitting the TBoMS is shown as a mark S in FIG. 22. Assuming that a number of symbol segment obtained after the starting symbol position is 1, and this symbol segment is marked as A in FIG. 22. At this time, this symbol segment is the target time domain resource. It is noted that the symbol segment includes uplink symbols and flexible symbols.

In embodiments of the present disclosure, the starting symbol position for transmitting the TBoMS on the special time slot is determined according to the offset, and M symbol segments located after the starting symbol position are obtained from the special time slot, and M symbol segments are determined as the target time domain resources for transmitting the TBoMS on the special time slots. Thus, the target time domain resources for transmitting the TBoMS on the special time slot are accurately determined and the time domain resources are rationally utilized.

Referring to FIG. 23, FIG. 23 is a schematic flowchart of another time domain resource assignment method provided by an embodiment of the present disclosure. This method is applied to the network equipment in the communication system shown in FIG. 1. That is, the method may be performed by the network device in the communication system shown in FIG. 1. As shown in FIG. 23, the method may include but is not limited to the following steps.

In step S2301, the time domain resource assignment (TDRA) table is configured to the terminal device, and the terminal device is instructed to use the special time slots to transmit one transport block (TBoMS) over a plurality of time slot.

In step S2301, according to the TDRA table, the target time domain resources for transmitting the TBoMS is determined on the special time slot.

In embodiments of the present disclosure, the terminal device determines that the current time slot for transmitting a transport block (TBoMS) over the plurality of time slots is a special time slot, the time domain resource assignment (TDRA) table is obtained, and the target time domain resource for transmitting the TBoMS on the special time slot is determined based on the TDRA table. Thus, the target time domain resources for transmitting the TBoMS on the special time slot are accurately determined based on the TDRA table, which realizes the transmission of TBoMS on the special time slot, thereby improving the coding efficiency.

In one embodiment of the present disclosure, the time domain resource assignment mode configured for the terminal device is obtained; and the TDRA table corresponding to the time domain resource assignment mode is obtained.

In another embodiment of the present disclosure, the method further includes: sending a first configuration signaling to the terminal device. The second first configuration signaling carries a time domain resource assignment mode configured for the terminal device.

In an implementation, the first configuration signaling is a system message, a radio resource control (RRC) signaling, a downlink control information (DCI) signaling, or a medium access control control element (MAC CE) signaling.

In another implementation, obtaining the time domain resource assignment mode includes; and obtaining a time slot format index number of the special time slot; obtaining the time domain resource assignment mode corresponding to the time slot format index number.

In an implementation, obtaining the time domain resource assignment mode includes: determining a time slot format of the special time slot; and determining a corresponding time domain resource assignment mode according to the time slot format of the special time slot.

In an implementation, when the time domain resource assignment mode is a first time domain resource assignment mode, determining the target time domain resource for transmitting the TBoMS on the special time slot according to the TDRA table includes: determining candidate time domain resources for transmitting the TBoMS on the special time slot according to the TDRA table; and determining the target time domain resource for transmitting the TBoMS on the special time slot according to the candidate time domain resources.

In an implementation, the TDRA table includes a first field and a second field. The first field represents an offset of a starting symbol position for transmitting the TBoMS on the special time slot relative to a starting symbol position of the special time slot, and the second field represents a symbol length between the starting symbol position and an ending symbol position for transmitting the TBoMS on the special time slot. Determining the candidate time domain resources for transmitting the TBoMS on the special time slot according to the TDRA table includes: determining the starting symbol position for transmitting the TBoMS on the special time slot according to the offset; and determining the candidate time domain resources for transmitting the TBoMS on the special time slot according to the starting symbol position and the first symbol length.

In another implementation, the candidate time domain resources include an uplink symbol, a downlink symbol and flexible symbols, and determining the target time domain resource for transmitting the TBoMS on the special time slot according to the candidate time domain resources includes: determining the uplink symbol in the candidate time domain resources as the target time domain resource: or determining the uplink symbol in the candidate time domain resources and an available flexible symbol in the flexible symbols as the target time domain resource: or determining the uplink symbol and the flexible symbols in the candidate time domain resources as the target time domain resource.

In another implementation, the candidate time domain resources includes an uplink symbol, a downlink symbol and flexible symbols. Determining the target time domain resource for transmitting the TBoMS on the special time slot according to the candidate time domain resources includes: in response to a priority of transmitting the TBoMS being a first priority, determining the uplink symbol in the candidate time domain resources as the target time domain resource: or in response to the priority of transmitting the TBoMS being a second priority, determining the uplink symbols in the candidate time domain resources and an available flexible symbol in the flexible symbols as the target time domain resource: or determining the uplink symbol and the flexible symbols in the candidate time domain resources as the target time domain resource. A level of the second priority is higher than a level of the first priority.

In an implementation, the candidate time domain resources include an uplink symbol, a downlink symbol and flexible symbols. Determining the target time domain resource for transmitting the TBoMS on the special time slot according to the candidate time domain resources includes: in response to a transmission mode for transmitting the TBoMS being a license-free transmission mode and the flexible symbols on the special time slot being configured by a slot format indication, determining the uplink symbol in the candidate time domain resources as the target time domain resource: or in response to a transmission mode for transmitting the TBoMS being a license-free transmission mode and the flexible symbols on the special time slot being configured by a high layer signaling, determining the uplink symbol in the candidate time domain resources and an available flexible symbol in the flexible symbols as the target time domain resource, or determining the uplink symbol and all flexible symbols in the candidate time domain resources as the target time domain resource.

In an implementation, when the time domain resource assignment mode is a second time domain resource assignment mode, the TDRA table includes a first field and a second field. The first field represents an offset between a starting symbol position for transmitting the TBoMS on the special time slot relative to a first uplink symbol position on the special time slot, and the second field represents a first symbol length. Determining the target time domain resource for transmitting the TBoMS on the special time slot according to the TDRA table includes: determining the starting symbol position for transmitting the TBoMS in the special time slot according to the offset: obtaining a difference obtained by subtracting the starting symbol position from a second symbol length of the special time slot: in response to the difference being less than the first symbol length, determining the difference as the first symbol length, and determining candidate time slot resources for transmitting the TBoMS in the special time slot according to the starting symbol position and the first symbol length: or in response to the difference being greater than or equal to the first symbol length, determining the candidate time domain resources for transmitting the TBoMS in the special time slot according to the starting symbol position and the first symbol length: determining all uplink symbols in the candidate time domain resources as the target time domain resource for transmitting the TBoMS in the special time slot.

In an implementation, when the time domain resource assignment mode is a second time domain resource assignment mode, the TDRA table includes a first field and a second field. The first field represents an offset of a plurality of starting symbol positions for transmitting the TBoMS on the special time slot relative to a position of a first uplink symbol in continuous uplink symbol segments corresponding to the starting symbol positions respectively, and the second field represents a first symbol length. Determining the target time domain resource for transmitting the TBoMS on the special time slot according to the TDRA table includes: determining a third symbol length of the uplink symbol on the special time slot according to a second symbol length of each continuous uplink symbol segment: in response to the third symbol length being less than the first symbol length, determining the third symbol length as the first symbol length, and determining the uplink symbol with the first symbol length as the target time domain resource according to each continuous uplink symbol segment and the starting symbol position of each segment: or in response to the third symbol length being greater than or equal to the first symbol length, determining the uplink symbol of the first symbol length as the target time domain resource according to each continuous uplink symbol segment and the starting symbol position of each segment.

In another implementation, when the time domain resource assignment mode is a second time domain resource assignment mode, the TDRA table includes a first field and a second field. The first field represents an offset of a starting symbol position for transmitting the TBoMS on the special time slot relative to a first available flexible symbol position on the special time slot, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference N obtained by subtracting the starting symbol position from the second symbol length of the special time slot, where N is an integer greater than or equal to 1: in response to N being less than the first symbol length, starting from the starting symbol position on the special time slot, obtaining N continuous symbols as the candidate time domain resources for transmitting the TBoMS on the special time slot: or in response to N being greater than or equal to the first symbol length, starting from the starting symbol position on the special time slot, obtaining a continuous symbol with a length being the first symbol length as the candidate time domain resources for transmitting the TBoMS on the special time slot: determining all available flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each segment of continuous flexible symbols and uplink symbols on the special time slot relative to a position of a first available flexible symbol, and the second field represents a first symbol length. Determining the target time domain resource for transmitting the TBoMS on the special time slot according to the TDRA table includes: determining a second symbol length according to each segment of continuous flexible symbols and uplink symbols, and the starting symbol position on each segment of continuous flexible symbols and uplink symbols: in response to the first symbol length being less than the second symbol length, determining the target time domain resource for transmitting the TBoMS according to the first symbol length, each segment of continuous flexible symbols and uplink symbols, and a starting symbol position of each segment of continuous flexible symbols and uplink symbols: or in response to the first symbol length being greater than the second symbol length, determining the target time domain resource for transmitting the TBoMS according to each continuous symbol and uplink symbol segment, and the starting position on each segment of continuous flexible symbols and uplink symbols.

In another implementation, when the time domain resource assignment mode is a second time domain resource assignment mode, the TDRA table includes a first field and a second field. The first field represents an offset of a starting symbol position for transmitting the TBoMS on the special time slot relative to a first flexible symbol position, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference obtained by subtracting a position of the first flexible symbol from a second symbol length of the special time slot: in response to the difference being less than the first symbol length, determining the difference as the first symbol length, starting from the starting symbol position on the special time slot, obtaining a continuous symbol with a length being the first symbol length as the candidate time domain resources for transmitting the TBoMS on the special time slot: or in response to the difference being greater than or equal to the first symbol length, starting from the starting symbol position on the special time slot, obtaining the continuous symbol with a length being the first symbol length as the candidate time domain resources for transmitting the TBoMS on the special time slot: determining all flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each continuous flexible symbol segment on the special time slot relative to a position of a first flexible symbol, and the second field represents a first symbol length. Determining the target time domain resource for transmitting the TBoMS on the special time slot according to the TDRA table includes: determining the second symbol length according to each continuous flexible symbol segment and the starting position on each continuous flexible symbol segment: in response to the first symbol length being less than the second symbol length, determining a target time domain resource for transmitting the TBoMS according to the first symbol length, each continuous flexible symbol segment, and a starting symbol position on each continuous flexible symbol segment: or in response to the first symbol length being greater than the second symbol length, determining the target time domain resource for transmitting the TBoMS according to each continuous symbol and uplink symbol segment, and the starting position on each continuous flexible symbol segment.

In an implementation, when the time domain resource assignment mode is a third time domain resource assignment mode, the TDRA table includes a first field and a second field. The first field represents an offset of a starting symbol position for transmitting the TBoMS relative to a starting symbol position of the special time slot, and the second field represents a number N of uplink symbols for transmitting the TBoMS on the special time slot. Determining the target time domain resource for transmitting the TBoMS on the special time slot according to the TDRA table includes: determining the starting symbol position of the time domain resource on the special time slot according to the offset: starting from the starting symbol position, obtaining the N uplink symbols on the special time slot as the target time domain resource for transmitting the TBoMS on the special time slot.

In another implementation, when the time domain resource assignment mode is a third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and available flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: from the special time slot, obtaining M symbol segments located after the starting symbol position, and determining the M symbol segments as the target time domain resource for transmitting the TBoMS on the special time slot. The symbol segment includes an uplink symbol and an available flexible symbol, a total number of symbols in the M symbol segments is N, and M is an integer greater than or equal to 1.

In an implementation, when the time domain resource assignment mode is a third time domain resource assignment mode, the TDRA table includes a first field and a second field. The first field represents an offset of the starting symbol position for transmitting the TBoMS on the special time slot relative to a starting symbol position of the special time slot, and the second field represents a number N of uplink symbols and flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: starting from the special time slot, obtaining M symbol segments located after the starting symbol position, and determining the M symbol segments as the target time domain resource for transmitting the TBoMS on the special time slot. The symbol segment comprises an uplink symbol and a flexible symbol, a total number of symbols in the M symbol segments is N, and M is an integer greater than or equal to 1.

In an implementation, the available flexible symbol is determined in a following mode: sending a second configuration signaling to the terminal device, in which the second configuration information is configured to indicate the number N of protection symbols: or sending a third configuration signaling to the terminal device, such that the terminal device determines the first N flexible symbols in each continuous flexible symbol segment on a special time slot as the protection symbols based on the information in the third configuration signaling and preset calculation rules, and the flexible symbols in each continuous flexible symbol segment that are not protected are used as the available flexible symbols, where N is an integer greater than or equal to 1.

In an implementation, the information in the third configuration signaling comprises at least one of: downlink to uplink transition time information: timing advance information; subcarrier spacing information.

In the above-mentioned embodiments provided by the present disclosure, the methods provided by embodiments of the present disclosure are introduced from the perspectives of network equipment and terminal device. In order to implement each function in the method provided by the above-mentioned embodiments of the present disclosure, network device and terminal device may include hardware structures and software modules to implement the above functions in the form of hardware structures, software modules, or hardware structures plus software modules. A certain function among the above functions may be executed by a hardware structure, a software module, or a hardware structure plus a software module.

Figure 24:
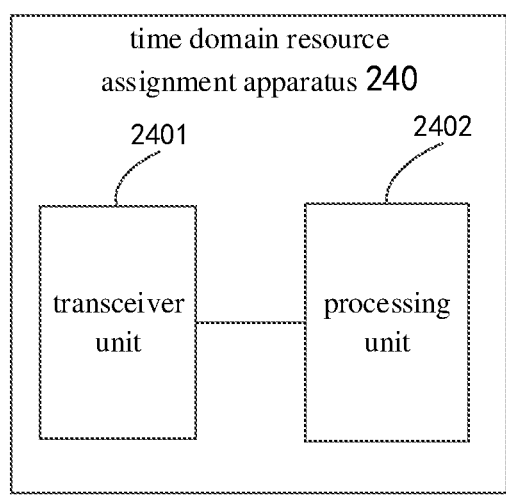
FIG. 24 is a schematic diagram of a time domain resource assignment device provided by an embodiment of the present disclosure.

Referring to FIG. 24, FIG. 24 is a schematic diagram of a time domain resource assignment apparatus 240 provided by an embodiment of the present disclosure. The time domain resource assignment apparatus 240 shown in FIG. 24 may include a transceiver unit 2401 and a processing unit 2402. The transceiver unit 2401 may include a sending unit and/or a receiving unit. The sending unit is configured to implement the sending function, and the receiving unit is configured to implement the receiving function. The transceiver unit 2401 may implement the sending function and/or the receiving function.

The time domain resource assignment apparatus 240 may be a network device, a device in the network device, or a device that may be used in conjunction with the network device. Alternatively, the time domain resource assignment apparatus 240 may be a terminal device, a device in the terminal device, or a device that may be used in conjunction with the terminal device.

The time domain resource assignment apparatus 240 is a terminal device, and the processing module 2401 is configured to obtain a time domain resource assignment (TDRA) table in response to a current time slot being a special time slot, wherein the current time slot is used for transmitting one transport block (TBoMS) over a plurality of time slots, and determine a target time domain resource for transmitting the TBoMS on the special time slot according to the TDRA table.

In an implementation manner, the specific manner of the processing module 2401 obtaining the time domain resource assignment TDRA table is: obtaining the time domain resource assignment method; and obtaining the TDRA table corresponding to the time domain resource assignment method.

In an implementation, the specific method of the processing module 2401 obtaining the time domain resource assignment mode is: receiving the first configuration signaling; and determining the time domain resource assignment method according to the first configuration signaling.

In an implementation, the first configuration signaling is a system message, a radio resource control (RRC) signaling, a downlink control information (DCI) signaling, or a medium access control control element (MAC CE) signaling.

In an implementation, the specific manner of the processing module 2401 obtaining the time domain resource assignment mode is: obtaining the time slot format index number of the special time slot; and obtaining the time domain resource assignment mode corresponding to the time slot format index number.

In an implementation, the specific manner of the processing module 2401 to obtain the time domain resource assignment mode is: determining a time slot format of the special time slot: determining the corresponding time domain resource assignment mode according to the time slot format of the special time slot.

In an implementation, when the time domain resource assignment mode is the first time domain resource assignment mode, determining the target time domain resources for transmitting the TBoMS on the special time slot according to the TDRA table includes: determining the candidate time domain resources for transmitting the TBoMS on the special time slot according to the TDRA table: according to the candidate time domain resources, determining the target time domain resources for transmitting the TBoMS on the special time slot.

In an implementation, the TDRA table includes a first field and a second field. The first field represents an offset of a starting symbol position for transmitting the TBoMS on the special time slot relative to a starting symbol position of the special time slot, and the second field represents a symbol length between the starting symbol position and the end symbol position for transmitting the TBoMS on the special time slot. According to the TDRA table, determining the candidate time domain resources for transmitting the TBoMS on the special time slot includes: determining the starting symbol position for transmitting the TBoMS in a special time slot based on the offset: determining the candidate time domain resources for transmitting the TBoMS in the special time slot based on the starting symbol position and the first symbol length.

In an implementation, the candidate time domain resources include an uplink symbol, a downlink symbol and flexible symbols. According to the candidate time domain resources, determine the target time domain resource for transmitting the TBoMS on the special time slot includes: determining the uplink symbol in the candidate time domain resources as the target time domain resource: or determining the uplink symbol in the candidate time domain resources and an available flexible symbol in the flexible symbols as the target time domain resource: or determining the uplink symbol and the flexible symbols in the candidate time domain resources as the target time domain resource.

In an implementation, the candidate time domain resources includes an uplink symbol, a downlink symbol and flexible symbols. Determining the target time domain resource for transmitting the TBoMS on the special time slot according to the candidate time domain resources includes: in response to a priority of transmitting the TBoMS being a first priority, determining the uplink symbol in the candidate time domain resources as the target time domain resource: or in response to the priority of transmitting the TBoMS being a second priority, determining the uplink symbols in the candidate time domain resources and an available flexible symbol in the flexible symbols as the target time domain resource: or determining the uplink symbol and the flexible symbols in the candidate time domain resources as the target time domain resource. A level of the second priority is higher than a level of the first priority.

In an implementation, the candidate time domain resources include an uplink symbol, a downlink symbol and flexible symbols. Determining the target time domain resource for transmitting the TBoMS on the special time slot according to the candidate time domain resources includes: in response to a transmission mode for transmitting the TBoMS being a license-free transmission mode and the flexible symbols on the special time slot being configured by a slot format indication, determining the uplink symbol in the candidate time domain resources as the target time domain resource: or in response to a transmission mode for transmitting the TBoMS being a license-free transmission mode and the flexible symbols on the special time slot being configured by a high layer signaling, determining the uplink symbol in the candidate time domain resources and an available flexible symbol in the flexible symbols as the target time domain resource, or determining the uplink symbol and all flexible symbols in the candidate time domain resources as the target time domain resource.

In an implementation, when the time domain resource assignment mode is a second time domain resource assignment mode, the TDRA table includes a first field and a second field. The first field represents an offset between a starting symbol position for transmitting the TBoMS on the special time slot relative to a first uplink symbol position on the special time slot, and the second field represents a first symbol length. Determining the target time domain resource for transmitting the TBoMS on the special time slot according to the TDRA table includes: determining the starting symbol position for transmitting the TBoMS in the special time slot according to the offset: obtaining a difference obtained by subtracting the starting symbol position from a second symbol length of the special time slot: in response to the difference being less than the first symbol length, determining the difference as the first symbol length, and determining candidate time slot resources for transmitting the TBoMS in the special time slot according to the starting symbol position and the first symbol length: or in response to the difference being greater than or equal to the first symbol length, determining the candidate time domain resources for transmitting the TBoMS in the special time slot according to the starting symbol position and the first symbol length: determining all uplink symbols in the candidate time domain resources as the target time domain resource for transmitting the TBoMS in the special time slot.

In an implementation, when the time domain resource assignment mode is a second time domain resource assignment mode, the TDRA table includes a first field and a second field. The first field represents an offset of a plurality of starting symbol positions for transmitting the TBoMS on the special time slot relative to a position of a first uplink symbol in continuous uplink symbol segments corresponding to the starting symbol positions respectively, and the second field represents a first symbol length. Determining the target time domain resource for transmitting the TBoMS on the special time slot according to the TDRA table includes: determining a third symbol length of the uplink symbol on the special time slot according to a second symbol length of each continuous uplink symbol segment: in response to the third symbol length being less than the first symbol length, determining the third symbol length as the first symbol length, and determining the uplink symbol with the first symbol length as the target time domain resource according to each continuous uplink symbol segment and the starting symbol position of each segment: or in response to the third symbol length being greater than or equal to the first symbol length, determining the uplink symbol of the first symbol length as the target time domain resource according to each continuous uplink symbol segment and the starting symbol position of each segment.

In an implementation, when the time domain resource assignment mode is a second time domain resource assignment mode, the TDRA table includes a first field and a second field. The first field represents an offset of a starting symbol position for transmitting the TBoMS on the special time slot relative to a first available flexible symbol position on the special time slot, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference N obtained by subtracting the starting symbol position from the second symbol length of the special time slot, where N is an integer greater than or equal to 1: in response to N being less than the first symbol length, starting from the starting symbol position on the special time slot, obtaining N continuous symbols as the candidate time domain resources for transmitting the TBoMS on the special time slot: or in response to N being greater than or equal to the first symbol length, starting from the starting symbol position on the special time slot, obtaining a continuous symbol with a length being the first symbol length as the candidate time domain resources for transmitting the TBoMS on the special time slot: determining all available flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each segment of continuous flexible symbols and uplink symbols on the special time slot relative to a position of a first available flexible symbol, and the second field represents a first symbol length. Determining the target time domain resource for transmitting the TBoMS on the special time slot according to the TDRA table includes: determining a second symbol length according to each segment of continuous flexible symbols and uplink symbols, and the starting symbol position on each segment of continuous flexible symbols and uplink symbols: in response to the first symbol length being less than the second symbol length, determining the target time domain resource for transmitting the TBoMS according to the first symbol length, each segment of continuous flexible symbols and uplink symbols, and a starting symbol position of each segment of continuous flexible symbols and uplink symbols: or in response to the first symbol length being greater than the second symbol length, determining the target time domain resource for transmitting the TBoMS according to each continuous symbol and uplink symbol segment, and the starting position on each segment of continuous flexible symbols and uplink symbols.

In an implementation, when the time domain resource assignment mode is a second time domain resource assignment mode, the TDRA table includes a first field and a second field. The first field represents an offset of a starting symbol position for transmitting the TBoMS on the special time slot relative to a first flexible symbol position, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference obtained by subtracting a position of the first flexible symbol from a second symbol length of the special time slot: in response to the difference being less than the first symbol length, determining the difference as the first symbol length, starting from the starting symbol position on the special time slot, obtaining a continuous symbol with a length being the first symbol length as the candidate time domain resources for transmitting the TBoMS on the special time slot: or in response to the difference being greater than or equal to the first symbol length, starting from the starting symbol position on the special time slot, obtaining the continuous symbol with a length being the first symbol length as the candidate time domain resources for transmitting the TBoMS on the special time slot: determining all flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each continuous flexible symbol segment on the special time slot relative to a position of a first flexible symbol, and the second field represents a first symbol length. Determining the target time domain resource for transmitting the TBoMS on the special time slot according to the TDRA table includes: determining the second symbol length according to each continuous flexible symbol segment and the starting position on each continuous flexible symbol segment: in response to the first symbol length being less than the second symbol length, determining a target time domain resource for transmitting the TBoMS according to the first symbol length, each continuous flexible symbol segment, and a starting symbol position on each continuous flexible symbol segment: or in response to the first symbol length being greater than the second symbol length, determining the target time domain resource for transmitting the TBoMS according to each continuous symbol and uplink symbol segment, and the starting position on each continuous flexible symbol segment.

In an implementation, when the time domain resource assignment mode is a third time domain resource assignment mode, the TDRA table includes a first field and a second field. The first field represents an offset of a starting symbol position for transmitting the TBoMS relative to a starting symbol position of the special time slot, and the second field represents a number N of uplink symbols for transmitting the TBoMS on the special time slot. Determining the target time domain resource for transmitting the TBoMS on the special time slot according to the TDRA table includes: determining the starting symbol position of the time domain resource on the special time slot according to the offset: starting from the starting symbol position, obtaining the N uplink symbols on the special time slot as the target time domain resource for transmitting the TBoMS on the special time slot.

In an implementation, when the time domain resource assignment mode is a third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and available flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: from the special time slot, obtaining M symbol segments located after the starting symbol position, and determining the M symbol segments as the target time domain resource for transmitting the TBoMS on the special time slot. The symbol segment includes an uplink symbol and an available flexible symbol, a total number of symbols in the M symbol segments is N, and M is an integer greater than or equal to 1.

In an implementation, when the time domain resource assignment mode is a third time domain resource assignment mode, the TDRA table includes a first field and a second field. The first field represents an offset of the starting symbol position for transmitting the TBoMS on the special time slot relative to a starting symbol position of the special time slot, and the second field represents a number N of uplink symbols and flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: starting from the special time slot, obtaining M symbol segments located after the starting symbol position, and determining the M symbol segments as the target time domain resource for transmitting the TBoMS on the special time slot. The symbol segment comprises an uplink symbol and a flexible symbol, a total number of symbols in the M symbol segments is N, and M is an integer greater than or equal to 1.

In an implementation, the available flexible symbol is determined in a following mode: according to a number N of protection symbols indicated in a second configuration signaling sent by the network device, determining first N flexible symbols in each continuous flexible symbol segment after the uplink symbol and the downlink symbol in the special time slot as the protection symbols, and determining flexible symbols that are not used as the protection symbols in each continuous flexible symbol segment as the available flexible symbol, where N is an integer greater than or equal to 1: or according to information in a protocol and/or a third configuration signaling from a network device, and a preset calculation rule, determining first N flexible symbols in each continuous flexible symbol segment on the special time slot as the protection symbols, and determining the flexible symbols that are not used as the protection symbols in each continuous flexible symbol segment as the available flexible symbol, where N is an integer greater than or equal to 1.

In an implementation, the information in the third configuration signaling comprises at least one of: downlink to uplink transition time information; timing advance information; subcarrier spacing information.

In an implementation, the method further includes: obtaining a time domain resource assignment mode configured for the terminal device; and obtaining a TDRA table corresponding to the time domain resource assignment mode.

In another implementation, the method further includes: sending a first configuration signaling to the terminal device. The second first configuration signaling carries a time domain resource assignment mode configured for the terminal device.

In an implementation, the first configuration signaling is a system message, a radio resource control (RRC) signaling, a downlink control information (DCI) signaling, or a medium access control control element (MAC CE) signaling.

In an implementation, obtaining the time domain resource assignment mode configured for the terminal device includes: obtaining the time slot format index number configured for the special time slot of the terminal device; and obtaining the time domain assignment mode corresponding to the time slot format index number.

In an implementation manner, obtaining the time domain resource assignment mode includes: determining the time slot format used by the special time slot set by the terminal; and determining the corresponding time domain resource assignment mode according to the time slot format of the special time slot.

In an implementation, when the time domain resource assignment mode is a first time domain resource assignment mode, determining the target time domain resource for transmitting the TBoMS on the special time slot according to the TDRA table includes: determining candidate time domain resources for transmitting the TBoMS on the special time slot according to the TDRA table; and determining the target time domain resource for transmitting the TBoMS on the special time slot according to the candidate time domain resources.

In an implementation, the TDRA table includes a first field and a second field. The first field represents an offset of a starting symbol position for transmitting the TBoMS on the special time slot relative to a starting symbol position of the special time slot, and the second field represents a symbol length between the starting symbol position and an ending symbol position for transmitting the TBoMS on the special time slot. Determining the candidate time domain resources for transmitting the TBoMS on the special time slot according to the TDRA table includes: determining the starting symbol position for transmitting the TBoMS on the special time slot according to the offset; and determining the candidate time domain resources for transmitting the TBoMS on the special time slot according to the starting symbol position and the first symbol length.

In an implementation, the candidate time domain resources include an uplink symbol, a downlink symbol and flexible symbols, and determining the target time domain resource for transmitting the TBoMS on the special time slot according to the candidate time domain resources includes: determining the uplink symbol in the candidate time domain resources as the target time domain resource: or determining the uplink symbol in the candidate time domain resources and an available flexible symbol in the flexible symbols as the target time domain resource: or determining the uplink symbol and the flexible symbols in the candidate time domain resources as the target time domain resource.

In an implementation, the candidate time domain resources includes an uplink symbol, a downlink symbol and flexible symbols. Determining the target time domain resource for transmitting the TBoMS on the special time slot according to the candidate time domain resources includes: in response to a priority of transmitting the TBoMS being a first priority, determining the uplink symbol in the candidate time domain resources as the target time domain resource: or in response to the priority of transmitting the TBoMS being a second priority, determining the uplink symbols in the candidate time domain resources and an available flexible symbol in the flexible symbols as the target time domain resource: or determining the uplink symbol and the flexible symbols in the candidate time domain resources as the target time domain resource. A level of the second priority is higher than a level of the first priority.

In an implementation, the candidate time domain resources include an uplink symbol, a downlink symbol and flexible symbols. Determining the target time domain resource for transmitting the TBoMS on the special time slot according to the candidate time domain resources includes: in response to a transmission mode for transmitting the TBoMS being a license-free transmission mode and the flexible symbols on the special time slot being configured by a slot format indication, determining the uplink symbol in the candidate time domain resources as the target time domain resource: or in response to a transmission mode for transmitting the TBoMS being a license-free transmission mode and the flexible symbols on the special time slot being configured by a high layer signaling, determining the uplink symbol in the candidate time domain resources and an available flexible symbol in the flexible symbols as the target time domain resource, or determining the uplink symbol and all flexible symbols in the candidate time domain resources as the target time domain resource.

In an implementation manner, when the time domain resource assignment mode is a second time domain resource assignment mode, the TDRA table includes a first field and a second field. The first field represents an offset between a starting symbol position for transmitting the TBoMS on the special time slot relative to a first uplink symbol position on the special time slot, and the second field represents a first symbol length. Determining the target time domain resource for transmitting the TBoMS on the special time slot according to the TDRA table includes: determining the starting symbol position for transmitting the TBoMS in the special time slot according to the offset: obtaining a difference obtained by subtracting the starting symbol position from a second symbol length of the special time slot: in response to the difference being less than the first symbol length, determining the difference as the first symbol length, and determining candidate time slot resources for transmitting the TBoMS in the special time slot according to the starting symbol position and the first symbol length: or in response to the difference being greater than or equal to the first symbol length, determining the candidate time domain resources for transmitting the TBoMS in the special time slot according to the starting symbol position and the first symbol length: determining all uplink symbols in the candidate time domain resources as the target time domain resource for transmitting the TBoMS in the special time slot.

In an implementation, when the time domain resource assignment mode is a second time domain resource assignment mode, the TDRA table includes a first field and a second field. The first field represents an offset of a plurality of starting symbol positions for transmitting the TBoMS on the special time slot relative to a position of a first uplink symbol in continuous uplink symbol segments corresponding to the starting symbol positions respectively, and the second field represents a first symbol length. Determining the target time domain resource for transmitting the TBoMS on the special time slot according to the TDRA table includes: determining a third symbol length of the uplink symbol on the special time slot according to a second symbol length of each continuous uplink symbol segment: in response to the third symbol length being less than the first symbol length, determining the third symbol length as the first symbol length, and determining the uplink symbol with the first symbol length as the target time domain resource according to each continuous uplink symbol segment and the starting symbol position of each segment: or in response to the third symbol length being greater than or equal to the first symbol length, determining the uplink symbol of the first symbol length as the target time domain resource according to each continuous uplink symbol segment and the starting symbol position of each segment.

In an implementation, when the time domain resource assignment mode is a second time domain resource assignment mode, the TDRA table includes a first field and a second field. The first field represents an offset of a starting symbol position for transmitting the TBoMS on the special time slot relative to a first available flexible symbol position on the special time slot, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference N obtained by subtracting the starting symbol position from the second symbol length of the special time slot, where N is an integer greater than or equal to 1: in response to N being less than the first symbol length, starting from the starting symbol position on the special time slot, obtaining N continuous symbols as the candidate time domain resources for transmitting the TBoMS on the special time slot: or in response to N being greater than or equal to the first symbol length, starting from the starting symbol position on the special time slot, obtaining a continuous symbol with a length being the first symbol length as the candidate time domain resources for transmitting the TBoMS on the special time slot: determining all available flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each segment of continuous flexible symbols and uplink symbols on the special time slot relative to a position of a first available flexible symbol, and the second field represents a first symbol length. Determining the target time domain resource for transmitting the TBoMS on the special time slot according to the TDRA table includes: determining a second symbol length according to each segment of continuous flexible symbols and uplink symbols, and the starting symbol position on each segment of continuous flexible symbols and uplink symbols: in response to the first symbol length being less than the second symbol length, determining the target time domain resource for transmitting the TBoMS according to the first symbol length, each segment of continuous flexible symbols and uplink symbols, and a starting symbol position of each segment of continuous flexible symbols and uplink symbols: or in response to the first symbol length being greater than the second symbol length, determining the target time domain resource for transmitting the TBoMS according to each continuous symbol and uplink symbol segment, and the starting position on each segment of continuous flexible symbols and uplink symbols In an implementation, when the time domain resource assignment mode is a second time domain resource assignment mode, the TDRA table includes a first field and a second field. The first field represents an offset of a starting symbol position for transmitting the TBoMS on the special time slot relative to a first flexible symbol position, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference obtained by subtracting a position of the first flexible symbol from a second symbol length of the special time slot: in response to the difference being less than the first symbol length, determining the difference as the first symbol length, starting from the starting symbol position on the special time slot, obtaining a continuous symbol with a length being the first symbol length as the candidate time domain resources for transmitting the TBoMS on the special time slot: or in response to the difference being greater than or equal to the first symbol length, starting from the starting symbol position on the special time slot, obtaining the continuous symbol with a length being the first symbol length as the candidate time domain resources for transmitting the TBoMS on the special time slot: determining all flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each continuous flexible symbol segment on the special time slot relative to a position of a first flexible symbol, and the second field represents a first symbol length. Determining the target time domain resource for transmitting the TBoMS on the special time slot according to the TDRA table includes: determining the second symbol length according to each continuous flexible symbol segment and the starting position on each continuous flexible symbol segment: in response to the first symbol length being less than the second symbol length, determining a target time domain resource for transmitting the TBoMS according to the first symbol length, each continuous flexible symbol segment, and a starting symbol position on each continuous flexible symbol segment: or in response to the first symbol length being greater than the second symbol length, determining the target time domain resource for transmitting the TBoMS according to each continuous symbol and uplink symbol segment, and the starting position on each continuous flexible symbol segment.

In an implementation, when the time domain resource assignment mode is a third time domain resource assignment mode, the TDRA table includes a first field and a second field. The first field represents an offset of a starting symbol position for transmitting the TBoMS relative to a starting symbol position of the special time slot, and the second field represents a number N of uplink symbols for transmitting the TBoMS on the special time slot. Determining the target time domain resource for transmitting the TBoMS on the special time slot according to the TDRA table includes: determining the starting symbol position of the time domain resource on the special time slot according to the offset: starting from the starting symbol position, obtaining the N uplink symbols on the special time slot as the target time domain resource for transmitting the TBoMS on the special time slot.

In an implementation, when the time domain resource assignment mode is a third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and available flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: from the special time slot, obtaining M symbol segments located after the starting symbol position, and determining the M symbol segments as the target time domain resource for transmitting the TBoMS on the special time slot. The symbol segment includes an uplink symbol and an available flexible symbol, a total number of symbols in the M symbol segments is N, and M is an integer greater than or equal to 1.

In an implementation, when the time domain resource assignment mode is a third time domain resource assignment mode, the TDRA table includes a first field and a second field. The first field represents an offset of the starting symbol position for transmitting the TBoMS on the special time slot relative to a starting symbol position of the special time slot, and the second field represents a number N of uplink symbols and flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: starting from the special time slot, obtaining M symbol segments located after the starting symbol position, and determining the M symbol segments as the target time domain resource for transmitting the TBoMS on the special time slot. The symbol segment comprises an uplink symbol and a flexible symbol, a total number of symbols in the M symbol segments is N, and M is an integer greater than or equal to 1.

In an implementation, the available flexible symbol is determined in a following mode: sending a second configuration signaling to the terminal device, in which the second configuration information is configured to indicate the number N of protection symbols: or sending a third configuration signaling to the terminal device, such that the terminal device determines the first N flexible symbols in each continuous flexible symbol segment on a special time slot as the protection symbols based on the information in the third configuration signaling and preset calculation rules, and the flexible symbols in each continuous flexible symbol segment that are not protected are used as the available flexible symbols, where N is an integer greater than or equal to 1.

In an implementation, the information in the third configuration signaling comprises at least one of: downlink to uplink transition time information: timing advance information; subcarrier spacing information.

The time domain resource assignment apparatus 240 may be a network device. The transceiver unit 2401 is configured to obtain a time domain resource assignment (TDRA) table in response to the current time slot for transmitting a transport block (TBoMS) over a plurality of time slots being a special time slot: the processing unit 2402 is configured to determine the target time domain resources for transmitting the TBoMS on special time slots based on the TDRA table.

In an implementation, obtaining the time domain resource assignment (TDRA) table includes: obtaining the time domain resource assignment mode; and obtaining the TDRA table corresponding to the time domain resource assignment mode.

In an implementation manner, obtaining the time domain resource assignment mode includes: receiving a first configuration signaling; and determining the time domain resource assignment mode according to the first configuration signaling.

In an implementation, the first configuration signaling is a system message, a radio resource control (RRC) signaling, a downlink control information (DCI) signaling, or a medium access control control element (MAC CE) signaling.

In an implementation, obtaining the time domain resource assignment mode includes: obtaining a time slot format index number of the special time slot: obtaining the time domain resource assignment mode corresponding to the time slot format index number.

In an implementation, obtaining the time domain resource assignment mode includes: determining a time slot format of the special time slot: determining a corresponding time domain resource assignment mode according to the time slot format of the special time slot.

In an implementation, when the time domain resource assignment method is the first time domain resource assignment mode is a first time domain resource assignment mode, determining the target time domain resource for transmitting the TBoMS on the special time slot according to the TDRA table includes: determining candidate time domain resources for transmitting the TBoMS on the special time slot according to the TDRA table; and determining the target time domain resource for transmitting the TBoMS on the special time slot according to the candidate time domain resources.

In an implementation, the TDRA table includes a first field and a second field. The first field represents an offset of a starting symbol position for transmitting the TBoMS on the special time slot relative to a starting symbol position of the special time slot, and the second field represents a symbol length between the starting symbol position and the end symbol position for transmitting the TBoMS on the special time slot. According to the TDRA table, determining the candidate time domain resources for transmitting the TBoMS on the special time slot includes: determining the starting symbol position for transmitting the TBoMS in a special time slot based on the offset: determining the candidate time domain resources for transmitting the TBoMS in the special time slot based on the starting symbol position and the first symbol length.

In an implementation, the candidate time domain resources include an uplink symbol, a downlink symbol and flexible symbols. According to the candidate time domain resources, determine the target time domain resource for transmitting the TBoMS on the special time slot includes: determining the uplink symbol in the candidate time domain resources as the target time domain resource: or determining the uplink symbol in the candidate time domain resources and an available flexible symbol in the flexible symbols as the target time domain resource: or determining the uplink symbol and the flexible symbols in the candidate time domain resources as the target time domain resource.

In an implementation, the candidate time domain resources includes an uplink symbol, a downlink symbol and flexible symbols. Determining the target time domain resource for transmitting the TBoMS on the special time slot according to the candidate time domain resources includes: in response to a priority of transmitting the TBoMS being a first priority, determining the uplink symbol in the candidate time domain resources as the target time domain resource: or in response to the priority of transmitting the TBoMS being a second priority, determining the uplink symbols in the candidate time domain resources and an available flexible symbol in the flexible symbols as the target time domain resource: or determining the uplink symbol and the flexible symbols in the candidate time domain resources as the target time domain resource. A level of the second priority is higher than a level of the first priority.

In an implementation, the candidate time domain resources include an uplink symbol, a downlink symbol and flexible symbols. Determining the target time domain resource for transmitting the TBoMS on the special time slot according to the candidate time domain resources includes: in response to a transmission mode for transmitting the TBoMS being a license-free transmission mode and the flexible symbols on the special time slot being configured by a slot format indication, determining the uplink symbol in the candidate time domain resources as the target time domain resource: or in response to a transmission mode for transmitting the TBoMS being a license-free transmission mode and the flexible symbols on the special time slot being configured by a high layer signaling, determining the uplink symbol in the candidate time domain resources and an available flexible symbol in the flexible symbols as the target time domain resource, or determining the uplink symbol and all flexible symbols in the candidate time domain resources as the target time domain resource.

In an implementation, when the time domain resource assignment mode is a second time domain resource assignment mode, the TDRA table includes a first field and a second field. The first field represents an offset between a starting symbol position for transmitting the TBoMS on the special time slot relative to a first uplink symbol position on the special time slot, and the second field represents a first symbol length. Determining the target time domain resource for transmitting the TBoMS on the special time slot according to the TDRA table includes: determining the starting symbol position for transmitting the TBoMS in the special time slot according to the offset: obtaining a difference obtained by subtracting the starting symbol position from a second symbol length of the special time slot: in response to the difference being less than the first symbol length, determining the difference as the first symbol length, and determining candidate time slot resources for transmitting the TBoMS in the special time slot according to the starting symbol position and the first symbol length: or in response to the difference being greater than or equal to the first symbol length, determining the candidate time domain resources for transmitting the TBoMS in the special time slot according to the starting symbol position and the first symbol length: determining all uplink symbols in the candidate time domain resources as the target time domain resource for transmitting the TBoMS in the special time slot In an implementation, when the time domain resource assignment mode is a second time domain resource assignment mode, the TDRA table includes a first field and a second field. The first field represents an offset of a plurality of starting symbol positions for transmitting the TBoMS on the special time slot relative to a position of a first uplink symbol in continuous uplink symbol segments corresponding to the starting symbol positions respectively, and the second field represents a first symbol length. Determining the target time domain resource for transmitting the TBoMS on the special time slot according to the TDRA table includes: determining a third symbol length of the uplink symbol on the special time slot according to a second symbol length of each continuous uplink symbol segment: in response to the third symbol length being less than the first symbol length, determining the third symbol length as the first symbol length, and determining the uplink symbol with the first symbol length as the target time domain resource according to each continuous uplink symbol segment and the starting symbol position of each segment: or in response to the third symbol length being greater than or equal to the first symbol length, determining the uplink symbol of the first symbol length as the target time domain resource according to each continuous uplink symbol segment and the starting symbol position of each segment.

In an implementation, when the time domain resource assignment mode is a second time domain resource assignment mode, the TDRA table includes a first field and a second field. The first field represents an offset of a starting symbol position for transmitting the TBoMS on the special time slot relative to a first available flexible symbol position on the special time slot, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference N obtained by subtracting the starting symbol position from the second symbol length of the special time slot, where N is an integer greater than or equal to 1: in response to N being less than the first symbol length, starting from the starting symbol position on the special time slot, obtaining N continuous symbols as the candidate time domain resources for transmitting the TBoMS on the special time slot: or in response to N being greater than or equal to the first symbol length, starting from the starting symbol position on the special time slot, obtaining a continuous symbol with a length being the first symbol length as the candidate time domain resources for transmitting the TBoMS on the special time slot: determining all available flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each segment of continuous flexible symbols and uplink symbols on the special time slot relative to a position of a first available flexible symbol, and the second field represents a first symbol length. Determining the target time domain resource for transmitting the TBoMS on the special time slot according to the TDRA table includes: determining a second symbol length according to each segment of continuous flexible symbols and uplink symbols, and the starting symbol position on each segment of continuous flexible symbols and uplink symbols: in response to the first symbol length being less than the second symbol length, determining the target time domain resource for transmitting the TBoMS according to the first symbol length, each segment of continuous flexible symbols and uplink symbols, and a starting symbol position of each segment of continuous flexible symbols and uplink symbols: or in response to the first symbol length being greater than the second symbol length, determining the target time domain resource for transmitting the TBoMS according to each continuous symbol and uplink symbol segment, and the starting position on each segment of continuous flexible symbols and uplink symbols.

In an implementation, when the time domain resource assignment mode is a second time domain resource assignment mode, the TDRA table includes a first field and a second field. The first field represents an offset of a starting symbol position for transmitting the TBoMS on the special time slot relative to a first flexible symbol position, and the second field represents a first symbol length. Determining the target time domain resource for transmitting the TBoMS on the special time slot according to the TDRA table includes: determining the starting symbol position for transmitting the TBoMS on the special time slot according to the offset: obtaining a difference obtained by subtracting a position of the first flexible symbol from a second symbol length of the special time slot: in response to the difference being less than the first symbol length, determining the difference as the first symbol length, starting from the starting symbol position on the special time slot, obtaining a continuous symbol with a length being the first symbol length as the candidate time domain resources for transmitting the TBoMS on the special time slot: or in response to the difference being greater than or equal to the first symbol length, starting from the starting symbol position on the special time slot, obtaining the continuous symbol with a length being the first symbol length as the candidate time domain resources for transmitting the TBoMS on the special time slot: determining all flexible symbols and the uplink symbol in the candidate time domain resources as the target time domain resource for transmitting the TBoMS on the special time slot.

In an implementation, when the time domain resource assignment mode is a second time domain resource assignment mode, the TDRA table includes a first field and a second field. The first field represents an offset of a starting symbol position on each continuous flexible symbol segment on the special time slot relative to a position of a first flexible symbol, and the second field represents a first symbol length. Determining the target time domain resource for transmitting the TBoMS on the special time slot according to the TDRA table includes: determining the second symbol length according to each continuous flexible symbol segment and the starting position on each continuous flexible symbol segment: in response to the first symbol length being less than the second symbol length, determining a target time domain resource for transmitting the TBoMS according to the first symbol length, each continuous flexible symbol segment, and a starting symbol position on each continuous flexible symbol segment: or in response to the first symbol length being greater than the second symbol length, determining the target time domain resource for transmitting the TBoMS according to each continuous symbol and uplink symbol segment, and the starting position on each continuous flexible symbol segment.

In an implementation manner, when the time domain resource assignment mode is a third time domain resource assignment mode, the TDRA table includes a first field and a second field. The first field represents an offset of a starting symbol position for transmitting the TBoMS relative to a starting symbol position of the special time slot, and the second field represents a number N of uplink symbols for transmitting the TBoMS on the special time slot. Determining the target time domain resource for transmitting the TBoMS on the special time slot according to the TDRA table includes: determining the starting symbol position of the time domain resource on the special time slot according to the offset: starting from the starting symbol position, obtaining the N uplink symbols on the special time slot as the target time domain resource for transmitting the TBoMS on the special time slot In an implementation, when the time domain resource assignment mode is a third time domain resource assignment mode, the TDRA table includes a first field and a second field. The first field represents an offset of a starting symbol position for transmitting the TBoMS on the special time slot relative to a starting symbol position of the special time slot, and the second field represents a number N of uplink symbols and available flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: from the special time slot, obtaining M symbol segments located after the starting symbol position, and determining the M symbol segments as the target time domain resource for transmitting the TBoMS on the special time slot. The symbol segment includes an uplink symbol and an available flexible symbol, a total number of symbols in the M symbol segments is N, and M is an integer greater than or equal to 1.

In an implementation, when the time domain resource assignment mode is a third time domain resource assignment mode, the TDRA table includes a first field and a second field. The first field represents an offset of the starting symbol position for transmitting the TBoMS on the special time slot relative to a starting symbol position of the special time slot, and the second field represents a number N of uplink symbols and flexible symbols for transmitting the TBoMS on the special time slot. Determining the target time domain resource for transmitting the TBoMS on the special time slot according to the TDRA table includes: determining the starting symbol position for transmitting the TBoMS on the special time slot according to the offset: starting from the special time slot, obtaining M symbol segments located after the starting symbol position, and determining the M symbol segments as the target time domain resource for transmitting the TBoMS on the special time slot. The symbol segment comprises an uplink symbol and a flexible symbol, a total number of symbols in the M symbol segments is N, and M is an integer greater than or equal to 1.

In an implementation, the available flexible symbols are determined in the following manner: according to a number N of protection symbols indicated in a second configuration signaling sent by the network device, determining first N flexible symbols in each continuous flexible symbol segment after the uplink symbol and the downlink symbol in the special time slot as the protection symbols, and determining flexible symbols that are not used as the protection symbols in each continuous flexible symbol segment as the available flexible symbol, where N is an integer greater than or equal to 1: or according to information in a protocol and/or a third configuration signaling from a network device, and a preset calculation rule, determining first N flexible symbols in each continuous flexible symbol segment on the special time slot as the protection symbols, and determining the flexible symbols that are not used as the protection symbols in each continuous flexible symbol segment as the available flexible symbol, where N is an integer greater than or equal to 1.

In an implementation, the information in the third configuration signaling comprises at least one of: downlink to uplink transition time information: timing advance information; subcarrier spacing information.

Figure 25:
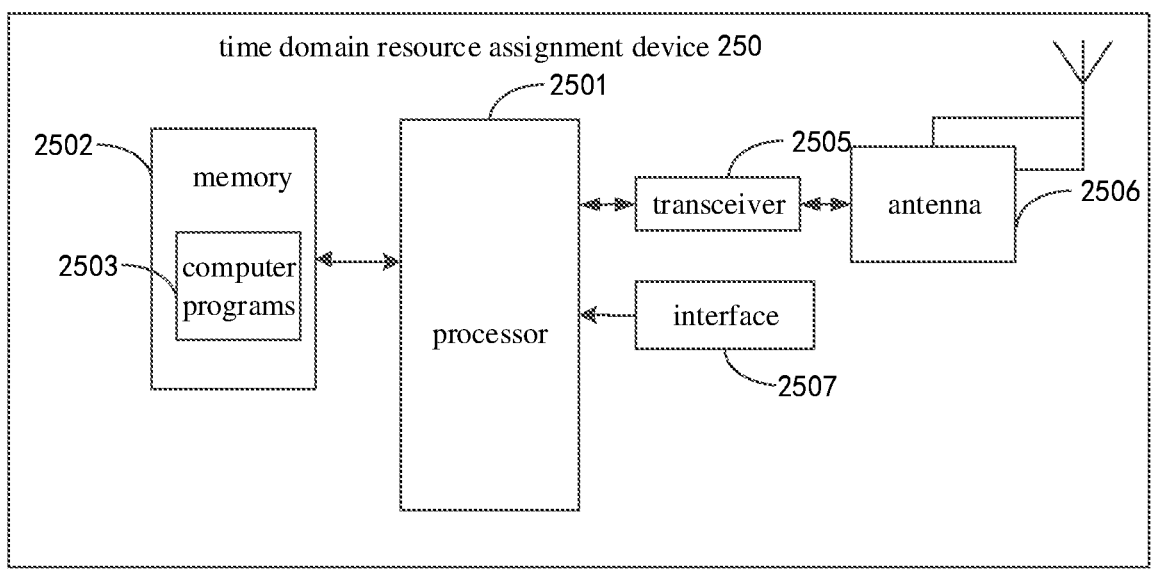
FIG. 25 is a schematic diagram of another time domain resource assignment device provided by an embodiment of the present disclosure.

Referring to FIG. 25, FIG. 25 is a schematic diagram of another time domain resource assignment device 250 provided by an embodiment of the present disclosure. The time domain resource assignment device 250 may be a network device, a terminal device, a chip, a chip system, a processor, etc. that supports a network device to implement the above method, or a chip or a chip that supports a terminal device to implement the above method. system, or processor, etc. The device may be used to implement the method described in the above-mentioned methods embodiment, which may refer to the description in the above-mentioned method embodiment in detail.

The time domain resource assignment device 250 may include one or more processors 2501. The processor 2501 may be a general-purpose processor or a special-purpose processor, or the like. For example, it may be a baseband processor or a central processing unit. The baseband processor may be used to process communication protocols and communication data, and the central processor may be used to control the time domain resource assignment device (such as base stations, baseband chips, terminal device, terminal device chips, DU or CU and the like) to execute computer programs and process data of the computer programs.

In an implementation, the time domain resource assignment device 250 may also include one or more memories 2502, on which a computer program 2503 may be stored. The processor 2501 executes the computer program 2503, so that the time domain resource assignment device 250 executes the method described in the above-mentioned method embodiments. The computer program 2503 may be solidified in the processor 2501, in which case the processor 2501 may be implemented by hardware.

In an implementation, the memory 2502 may also store data. The time domain resource assignment device 250 and the memory 2502 may be set up separately or integrated together.

In an implementation, the time domain resource assignment device 250 may also include a transceiver 2505 and an antenna 2506. The transceiver 2505 may be called a transceiver unit, a transceiver, a transceiver circuit, etc., and configured to implement transceiver functions. The transceiver 2505 may include a receiver and a transmitter. The receiver may be called a receiver or a receiving circuit, etc., and configured to implement the receiving function. The transmitter may be called a transmitter, a transmitting circuit, etc., and configured to implement the transmitting function.

In an implementation, the time domain resource assignment device 250 may also include one or more interface circuits 2507. The interface circuit 2507 is configured to receive code instructions and transmit them to the processor 2501. The processor 2501 executes code instructions to cause the time domain resource assignment device 250 to execute the method described in the above method embodiments.

The time domain resource assignment device 250 is a terminal device, and the processor 2501 is configured to execute the time domain resource assignment method in any one of the above-mentioned embodiments.

In one implementation, the processor 2501 may include a transceiver for implementing receiving and transmitting functions. For example, the transceiver may be a transceiver circuit, an interface, or an interface circuit. The transceiver circuits, the interfaces or the interface circuits configured to implement the receiving and transmitting functions may be separate or integrated together. The above-mentioned transceiver circuit, interface or interface circuit may be configured for reading and writing codes/data, or the above-mentioned transceiver circuit, interface or interface circuit may be used for signal transmission or transfer.

In one implementation, the time domain resource assignment device 250 may include a circuit, and the circuit may implement sending or receiving or communication functions in the above-mentioned method embodiments. The processor and the transceiver described in the present disclosure may be implemented in an integrated circuits (IC), an analog IC, a radio frequency integrated circuits (RFIC), a mixed signal (IC), an application specific integrated circuits (ASIC), a printed circuit boards (PCB), electronic equipment, etc. The processor and the transceiver may also be manufactured using various IC process technologies, such as a complementary metal oxide semiconductor (CMOS), a N-type metal-oxide-semiconductor (NMOS), a P-type metal oxide semiconductor (PMOS), a bipolar junction transistor (BJT), a bipolar CMOS (BiCMOS), a silicon germanium (SiGe), a gallium arsenide (GaAs), etc.

The time domain resource assignment device described in the above embodiments may be a network device or a terminal device, but the scope of the time domain resource assignment device described in the present disclosure is not limited to this, and the structure of the time domain resource assignment device may not be as shown in FIG. 25 limits. The time domain resource assignment device may be a stand-alone device or may be part of a larger device. For example, the time domain resource assignment device may be:

(1) independent integrated circuit (IC), or chip, or chip system or subsystem;

(2) a collection of one or more ICs, or, the IC collection may also include storage components for storing data and computer programs;

(3) ASIC, such as modem;

(4) modules that may be embedded in other devices;

(5) receivers, terminal device, intelligent terminal device, cellular phones, wireless equipment, handheld devices, mobile units, vehicle-mounted equipment, network equipment, cloud equipment, artificial intelligence equipment, etc.;

(6) others.

Figure 26:
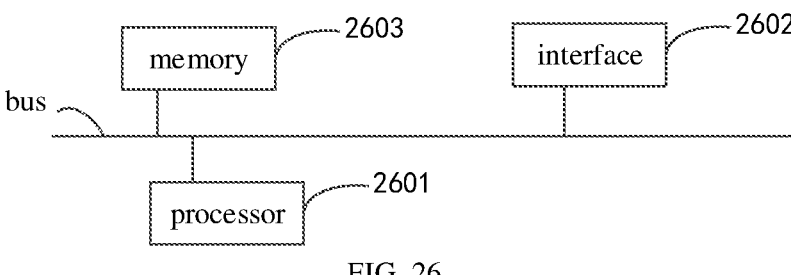
FIG. 26 is a schematic diagram of a chip provided by an embodiment of the present disclosure.

For the case where the time domain resource assignment device may be a chip or a chip system, refer to the schematic structural diagram of the chip shown in FIG. 26. The chip shown in FIG. 26 includes a processor 2601 and an interface 2602. The number of processors 2601 may be one or more, and the number of interfaces 2602 may be multiple.

For the case where the chip is configured to implement the functions of the network device in embodiments of the present disclosure.

The interface 2602 is configured to process code instructions and transmit them to the processor.

The processor 2601 is configured to run code instructions to perform the methods in FIGS. 2, 3, 7, 9, 11, 13, 14, 16, 17, 19 and 21.

For the case where the chip is configured to implement the functions of the terminal device in embodiments of the present disclosure.

The interface 2602 is configured for code instructions and transmission to the processor.

The processor 2601 is configured to run code instructions to perform the method as shown in FIG. 22.

In an implementation, the chip also includes a memory 2603, which is used to store necessary computer programs and data.

Those skilled in the art may also understand that the various illustrative logical blocks and steps listed in embodiments of the present disclosure may be implemented by electronic hardware, computer software, or a combination of both. Whether such functionality is implemented in hardware or software depends on the specific application and overall system design requirements. Those skilled in the art may use various methods to implement the functions for each specific application, but such implementation should not be understood as exceeding the scope of protection of embodiments of the present disclosure.

Embodiments of the present disclosure also provide a communication system that includes a time domain resource assignment device as a terminal device in the above-mentioned embodiment of FIG. 24 and a time domain resource assignment device as a network device, or the system includes a time domain resource assignment device as a terminal device in the above-mentioned embodiment of FIG. 25 and a time domain resource assignment device as a network equipment.

The present disclosure also provides a readable storage medium on which instructions are stored. When the instructions are executed by a computer, the functions of any one of the above-mentioned method embodiments are implemented.

The present disclosure also provides a computer program product, when the computer program product is executed by a computer, the functions of any one of the above-mentioned method embodiments are implemented.

In the above-mentioned embodiments, it may be implemented in whole or in part by software, hardware, firmware, or any combination thereof. When implemented using software, it may be implemented in whole or in part in the form of a computer program product. A computer program product includes one or more computer programs. When a computer program is loaded and executed on a computer, processes or functions according to embodiments of the present disclosure are generated in whole or in part. The computer may be a general purpose computer, a special purpose computer, a computer network, or other programmable device. The computer program may be stored in or transmitted from one computer-readable storage medium to another computer-readable storage medium, for example, the computer program may be transmitted from a website, a computer, a server or a data center via a wireline (e.g. coaxial cable, optical fiber, digital subscriber line (DSL)) or wireless (such as infrared, wireless, microwave, etc.) means to transmit to another website, computer, server or data center. The computer-readable storage media may be any available media that may be accessed by a computer or a data storage device such as a server, data center, or other integrated media that contains one or more available media. The usable media may be magnetic media (e.g., floppy disks, hard disks, tapes), optical media (e.g., high-density digital video discs (DVDs)), or semiconductor media (e.g., solid state disks (SSDs)) and the like.

Those skilled in the art may understand that the first, second, and other numerical numbers involved in the present disclosure are only for convenience of description and are not used to limit the scope of embodiments of the present disclosure and also indicate the order.

At least one in the present disclosure may also be described as one or more, and the plurality may be two, three, four or more, and the present disclosure is not limited. In embodiments of the present disclosure, for a technical feature, the technical feature is distinguished by "first", "second", "third", "A", "B", "C" and "D", etc. The technical features described in "first", "second", "third", "A", "B", "C" and "D" are in no particular order or order.

The corresponding relationships shown in each table in the present disclosure may be configured or predefined. The values of the information in each table are only examples and may be configured as other values, which are not limited by the present disclosure. When configuring the correspondence between information and each parameter, it is not necessarily required to configure all the correspondences shown in each table. For example, in the table in the present disclosure, the corresponding relationships shown in some rows may not be configured. For another example, appropriate deformation adjustments may be made based on the above table, such as splitting, merging, etc. The names of the parameters shown in the titles of the above tables may also be other names understandable by the communication device, and the values or expressions of the parameters may also be other values or expressions understandable by the communication device. When implementing the above tables, other data structures may also be used, such as arrays, queues, containers, stacks, linear lists, pointers, linked lists, trees, graphs, structures, classes, heaps, hash tables or hash tables.

Predefinition in the present disclosure may be understood as definition, pre-definition, storage, pre-storage, pre-negotiation, pre-configuration, solidification, or pre-burning.

Those skilled in the art will appreciate that the units and algorithm steps of each example described in conjunction with embodiments disclosed herein may be implemented with electronic hardware, or a combination of computer software and electronic hardware. Whether these functions are performed in hardware or software depends on the specific application and design constraints of the technical solution. Those skilled in the art may implement the described functionality using different methods for each specific application, but such implementations should not be considered beyond the scope of the present disclosure.

Those skilled in the art may clearly understand that for the convenience and simplicity of description, the specific working processes of the systems, devices and units described above may be referred to the corresponding processes in the foregoing method embodiments, and will not be described again here.

The above are only specific embodiments of the present disclosure, but the protection scope of the present disclosure is not limited thereto. Those skilled in the art may easily think of changes or replacements within the technical scope disclosed in the present disclosure, and all of them is covered within the protection scope of the present disclosure. Therefore, the protection scope of the present disclosure is subject to the protection scope of the claims.

What is claimed is:

1. A time domain resource assignment method, performed by a terminal device and comprising:
    obtaining a time domain resource assignment (TDRA) table in response to a current time slot being a specific time slot, wherein the current time slot is configured for transmitting a transport block (TBoMS) over a plurality of time slots; and
    determining a target time domain resource for transmitting the TBoMS on the specific time slot according to the TDRA table,
    wherein obtaining the TDRA table comprises:
        obtaining a time domain resource assignment mode; and
        obtaining the TDRA table corresponding to the time domain resource assignment mode;
    wherein when the time domain resource assignment mode is a first time domain resource assignment mode, the TDRA table comprises a first field and a second field; the first field represents an offset of a starting symbol position for transmitting the TBoMS on the specific time slot relative to a starting symbol position of the specific time slot, and the second field represents a number N of uplink symbols and available flexible symbols for transmitting the TBoMS on the specific time slot; and
    determining the target time domain resource for transmitting the TBoMS on the specific time slot according to the TDRA table comprises:
        determining the starting symbol position for transmitting the TBoMS on the specific time slot according to the offset; and
        from the specific time slot, obtaining M symbol segments located after the starting symbol position, and determining the M symbol segments as the target time domain resource for transmitting the TBoMS on the specific time slot, wherein the symbol segment comprises an uplink symbol and an available flexible symbol, a total number of symbols in the M symbol segments is N, and M is an integer greater than or equal to 1.

2. The method according to claim 1, wherein obtaining the time domain resource assignment mode comprises:
    receiving a first configuration signaling; and determining the time domain resource assignment mode according to the first configuration signaling.

3. The method according to claim 2, wherein the first configuration signaling is at least one of a system message, a radio resource control (RRC) signaling, a downlink control information (DCI) signaling, or a medium access control control element (MAC CE) signaling.

4. The method according to claim 1, wherein obtaining the time domain resource assignment mode comprises:
    obtaining a time slot format index number of the specific time slot; and
    obtaining the time domain resource assignment mode corresponding to the time slot format index number.

5. The method according to claim 1, wherein obtaining the time domain resource assignment mode comprises:
    determining a time slot format of the specific time slot; and
    determining a corresponding time domain resource assignment mode according to the time slot format of the specific time slot.

6. The method according to claim 1, wherein when the time domain resource assignment mode is a second time domain resource assignment mode, determining the target time domain resource for transmitting the TBoMS on the specific time slot according to the TDRA table comprises:
    determining candidate time domain resources for transmitting the TBoMS on the specific time slot according to the TDRA table; and
    determining the target time domain resource for transmitting the TBoMS on the specific time slot according to the candidate time domain resources.

7. The method according to claim 6, wherein the TDRA table comprises a first field and a second field, the first field represents an offset of a starting symbol position for transmitting the TBoMS on the specific time slot relative to a starting symbol position of the specific time slot, and the second field represents a symbol length between the starting symbol position and an ending symbol position for transmitting the TBoMS on the specific time slot; and
    determining the candidate time domain resources for transmitting the TBoMS on the specific time slot according to the TDRA table comprises:
    determining the starting symbol position for transmitting the TBoMS on the specific time slot according to the offset; and
    determining the candidate time domain resources for transmitting the TBoMS on the specific time slot according to the starting symbol position and the symbol length.

8. A time domain resource assignment method, performed by a network device and comprising:
    configuring a time domain resource assignment (TDRA) table to a terminal device, and instructing the terminal device to use a specific time slot to transmit a transport block (TBoMS) over a plurality of time slots;
    determining a target time domain resource for transmitting the TBoMS on the specific time slot according to the TDRA table;
    obtaining a time domain resource assignment mode configured for the terminal device; and
    obtaining the TDRA table corresponding to the time domain resource assignment mode;
    wherein when the time domain resource assignment mode is a first time domain resource assignment mode, the TDRA table comprises a first field and a second field; the first field represents an offset of a starting symbol position for transmitting the TBoMS on the specific time slot relative to a starting symbol position of the specific time slot, and the second field represents a number N of uplink symbols and available flexible symbols for transmitting the TBoMS on the specific time slot; and determining the target time domain resource for transmitting the TBoMS on the specific time slot according to the TDRA table comprises:

determining the starting symbol position for transmitting the TBoMS on the specific time slot according to the offset; and from the specific time slot, obtaining M symbol segments located after the starting symbol position, and determining the M symbol segments as the target time domain resource for transmitting the TBoMS on the specific time slot, wherein the symbol segment comprises an uplink symbol and an available flexible symbol, a total number of symbols in the M symbol segments is N, and M is an integer greater than or equal to 1.

9. The method according to claim 8, when the time domain resource assignment mode is a second time domain resource assignment mode, determining the target time domain resource for transmitting the TBoMS on the specific time slot according to the TDRA table comprises:

determining candidate time domain resources for transmitting the TBoMS on the specific time slot according to the TDRA table; and determining the target time domain resource for transmitting the TBoMS on the specific time slot according to the candidate time domain resources.

10. The method according to claim 9, wherein the TDRA table comprises a first field and a second field, the first field represents an offset of a starting symbol position for transmitting the TBoMS on the specific time slot relative to a starting symbol position of the specific time slot, and the second field represents a symbol length between the starting symbol position and an ending symbol position for transmitting the TBoMS on the specific time slot; and determining the candidate time domain resources for transmitting the TBoMS on the specific time slot according to the TDRA table comprises:

determining the starting symbol position for transmitting the TBoMS on the specific time slot according to the offset; and determining the candidate time domain resources for transmitting the TBoMS on the specific time slot according to the starting symbol position and the symbol length.

11. A time domain resource assignment device, comprising:

a processor; and a memory for storing computer programs executable by the processor, wherein the processor is configured to perform the method according to claim 8.

12. A time domain resource assignment device, comprising:

a processor; and a memory for storing computer programs executable by the processor, wherein the processor is configured to:

obtain a time domain resource assignment (TDRA) table in response to a current time slot being a specific time slot, wherein the current time slot is configured for transmitting a transport block (TBoMS) over a plurality of time slots; and determine a target time domain resource for transmitting the TBoMS on the specific time slot according to the TDRA table, wherein the processor is further configured to:

obtain a time domain resource assignment mode; and obtain the TDRA table corresponding to the time domain resource assignment mode;

wherein when the time domain resource assignment mode is a third time domain resource assignment mode, the TDRA table comprises a first field and a second field; the first field represents an offset of a starting symbol position for transmitting the TBoMS on the specific time slot relative to a starting symbol position of the specific time slot, and the second field represents a number N of uplink symbols and available flexible symbols for transmitting the TBoMS on the specific time slot; and the processor is further configured to:

determine the starting symbol position for transmitting the TBoMS on the specific time slot according to the offset; and from the specific time slot, obtain M symbol segments located after the starting symbol position, and determine the M symbol segments as the target time domain resource for transmitting the TBoMS on the specific time slot, wherein the symbol segment comprises an uplink symbol and an available flexible symbol, a total number of symbols in the M symbol segments is N, and M is an integer greater than or equal to 1.

\* \* \* \* \*